US012123435B2

(12) United States Patent
Harimoto et al.

(10) Patent No.: US 12,123,435 B2
(45) Date of Patent: Oct. 22, 2024

(54) FLUID CIRCUIT SELECTION SYSTEM AND FLUID CIRCUIT SELECTION METHOD

(71) Applicant: SMC CORPORATION, Chiyoda-ku (JP)

(72) Inventors: Gohei Harimoto, Moriya (JP); Mitsuru Senoo, Moriya (JP); Yuto Fujiwara, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 848 days.

(21) Appl. No.: 16/973,947

(22) PCT Filed: Jun. 7, 2019

(86) PCT No.: PCT/JP2019/022677
§ 371 (c)(1),
(2) Date: Dec. 10, 2020

(87) PCT Pub. No.: WO2019/240022
PCT Pub. Date: Dec. 19, 2019

(65) Prior Publication Data

US 2021/0246913 A1 Aug. 12, 2021

(30) Foreign Application Priority Data

Jun. 13, 2018 (JP) ................................ 2018-113155

(51) Int. Cl.
*F15B 11/064* (2006.01)
*F15B 11/044* (2006.01)
*F15B 15/14* (2006.01)

(52) U.S. Cl.
CPC .......... *F15B 11/064* (2013.01); *F15B 11/044* (2013.01); *F15B 15/1447* (2013.01);
(Continued)

(58) Field of Classification Search
CPC .. F15B 11/064; F15B 11/044; F15B 15/1447; F15B 2211/30505; F15B 2211/3058;
(Continued)

(56) References Cited

U.S. PATENT DOCUMENTS 6,282,463 B1 * 8/2001 Oneyama .............. F15B 21/003 707/999.102
2008/0109745 A1 * 5/2008 Zhang .................. F15B 19/007 703/7
2019/0277310 A1 9/2019 Takakuwa et al.

FOREIGN PATENT DOCUMENTS

EP 1 011 038 A2 6/2000
EP 1 813 822 A1 8/2007
JP 2018-54117 A 4/2018

OTHER PUBLICATIONS

International Search Report issued Jul. 9, 2019 in PCT/JP2019/022677 filed Jun. 7, 2019.

(Continued)

*Primary Examiner* — Eunhee Kim
(74) *Attorney, Agent, or Firm* — Oblon, McClelland, Maier & Neustadt, L.L.P.

(57) ABSTRACT

A selection system for hydraulic circuits has a cylinder selection processing unit; a database in which information pertaining to a combination of a plurality of apparatuses is registered in advance; combination selection processing units for reading information pertaining to the combination of the plurality of apparatuses in order of size from the database, and selecting an apparatus; and re-selection processing units for re-selecting an apparatus that is the next size up when a stroke time obtained by a simulation including some of the apparatuses selected by the combination selection unit exceeds an upper-limit stroke time, or when pressure after a return process is less than or equal to minimum working pressure.

6 Claims, 19 Drawing Sheets

(52) U.S. Cl.
CPC ............... *F15B 2211/30505* (2013.01); *F15B 2211/3058* (2013.01); *F15B 2211/75* (2013.01)

(58) Field of Classification Search
CPC .. F15B 2211/75; F15B 11/024; F15B 19/007; F15B 21/003; F15B 2211/3133; F15B 2211/88; F15B 2211/8855; F15B 11/06; F15B 1/26; F15B 11/04; F15B 15/1428; F15B 15/24
See application file for complete search history.

(56) References Cited

OTHER PUBLICATIONS

Extended European Search Report issued Jan. 26, 2022 in European Patent Application No. 19820278.0, 9 pages.
Indian Office Action issued on Apr. 21, 2022 in Indian Patent Application No. 202147000593, 5 pages.

* cited by examiner

FIG. 7A

CYLINDER DATABASE DB1

PRODUCT NUMBER
BORE DIAMETER D (mm)
ROD DIAMETER d (mm)
SONIC CONDUCTANCE C0 (L/(s·bar)) OF FIXED THROTTLE
STATIC FRICTION FORCE Fs (N)
KINETIC FRICTION FORCE Fd (N)
VISCOUS FRICTION COEFFICIENT Cm (N/(mm/s))
MASS OF ROD AND PISTON mc (kg)
MINIMUM WORKING PRESSURE Pmin OF CYLINDER
⋮

FIG. 7B

PIPE DATABASE DB2

PRODUCT NUMBER
OUTER DIAMETER De (mm)
INNER DIAMETER Di (mm)
MATERIAL
⋮

FIG. 7C

TANK DATABASE DB3

PRODUCT NUMBER
VOLUME
SIZE (MAXIMUM OUTER DIAMETER, MAXIMUM LENGTH)
⋮

FIG. 8A

SPEED CONTROL VALVE DATABASE DB4

PRODUCT NUMBER
SIZE
SONIC CONDUCTANCE (L/(s·bar))
⋮

FIG. 8B

CHECK VALVE DATABASE DB5

PRODUCT NUMBER
SIZE
SONIC CONDUCTANCE (L/(s·bar))
⋮

FIG. 8C

VALVE DATABASE DB6

PRODUCT NUMBER
SIZE
SONIC CONDUCTANCE (L/(s·bar))
RESPONSE TIME (s)
⋮

FIG. 8D

SILENCER DATABASE DB7

PRODUCT NUMBER
SIZE
SONIC CONDUCTANCE (L/(s·bar))
⋮

FIG. 9

INSTRUMENT COMBINATION DATABASE DB8

| COMBINATION NUMBER | PIPE A | PIPE B | PIPE C | TANK D | CHECK VALVE E | SPEED CONTROL VALVE F | SPEED CONTROL VALVE G |
|---|---|---|---|---|---|---|---|
| 1 | | | | | | | |
| 2 | | | | | | | |
| 3 | | | | | | | |
| 4 | | | | | | | |
| 5 | | | | | | | |
| 6 | | | | | | | |
| 7 | | | | | | | |
| 8 | | | | | | | |
| 9 | | | | | | | |
| 10 | | | | | | | |
| | | | | | | | |
| | | | | | | | |
| 17 | | | | | | | |
| 18 | | | | | | | |
| 19 | | | | | | | |
| 20 | | | | | | | |
| 21 | | | | | | | |
| 22 | | | | | | | |
| 23 | | | | | | | |
| 24 | | | | | | | |
| 25 | | | | | | | |
| ⋮ | ⋮ | ⋮ | ⋮ | ⋮ | ⋮ | ⋮ | ⋮ |

FIG. 10

SECOND INSTRUMENT COMBINATION DATABASE DB8a

| COMBINATION NUMBER | PIPE A | PIPE B | PIPE C | TANK D | CHECK VALVE E | SPEED CONTROL VALVE F | SPEED CONTROL VALVE G | VALVE H | SILENCER I |
|---|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| | | | | | | | | | |
| | | | | | | | | | |
| 17 | | | | | | | | | |
| 18 | | | | | | | | | |
| 19 | | | | | | | | | |
| 20 | | | | | | | | | |
| 21 | | | | | | | | | |
| 22 | | | | | | | | | |
| 23 | | | | | | | | | |
| 24 | | | | | | | | | |
| 25 | | | | | | | | | |
| ⋮ | ⋮ | ⋮ | ⋮ | ⋮ | ⋮ | ⋮ | ⋮ | ⋮ | ⋮ |

FIG. 11A

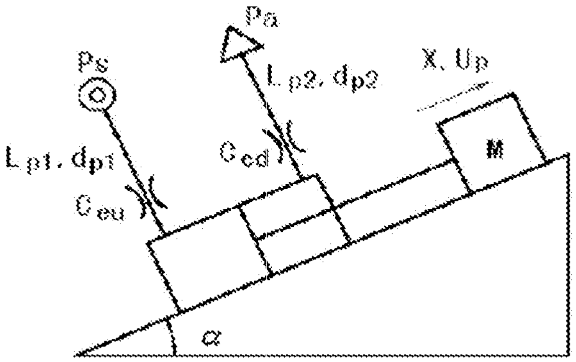

FIG. 11B $$q_m = C p_1 \rho_0 \sqrt{\frac{T_0}{T_1}} \qquad (1a)$$

$$q_m = C p_1 \rho_0 \sqrt{\frac{T_0}{T_1}} \sqrt{1 - \left( \frac{\frac{P_2}{P_1} - b}{1 - b} \right)^2} \qquad (1b)$$

FIG. 11C

STATE EQUATION $$PV = wR\theta \qquad (2)$$

↓ DIFFERENTIATE

DISCHARGE CHAMBER $$\frac{dD_d}{dt} = \frac{1}{V_d}\left( \frac{P_d V_d}{\theta_d}\frac{d\theta_d}{dt} + R\theta_d G_d - P_d \frac{dV_d}{dt} \right) \qquad (3)$$

CHARGE CHAMBER $$\frac{dD_u}{dt} = \frac{1}{V_u}\left( \frac{P_u V_u}{\theta_u}\frac{d\theta_u}{dt} + R\theta_u G_u - P_u \frac{dV_u}{dt} \right) \qquad (4)$$

ENERGY EQUATION $$\frac{t}{dt}(C_v w\theta) = Q + CpG\theta_1 + P\frac{dV}{dt} \qquad (5)$$

↓

DISCHARGE CHAMBER $$\frac{d\theta_d}{dt} = \frac{1}{C_v w_d}\left( S_{hd} h_d(\theta_a - \theta_d) + RG_d\theta_d - P_d \frac{dV_d}{dt} \right) \qquad (6)$$

CHARGE CHAMBER $$\frac{d\theta_u}{dt} = \frac{1}{C_v w_u}\left( S_{hu} h_u(\theta_a - \theta_u) + C_p G_u \theta_1 - C_v G_u \theta_u - P_u \frac{dV_u}{dt} \right) \qquad (7)$$

MOTION EQUATION $$M = \frac{dU_p}{dt} = P_u S_u - P_d S_d + P_a(S_d - S_u) - Mg\sin\alpha - cu_p - Fq \qquad (8)$$

FIG. 12A

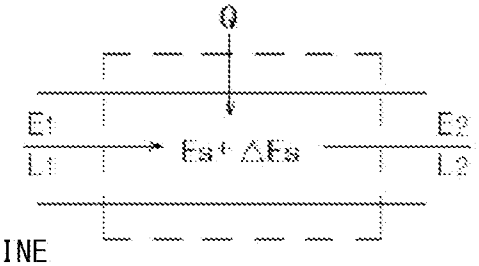

FIG. 12B

BASIC EQUATIONS FOR PIPELINE

CONTINUITY EQUATION $\frac{\partial \rho}{\partial t} + \rho\frac{\partial u}{\partial z} + u\frac{\partial \rho}{\partial z} = 0$ (9)

STATE EQUATION $V\frac{dP}{dt} = R\theta\frac{dW}{dt} + wR\frac{d\theta}{dt}$ (10)

MOTION EQUATION $\frac{\partial u}{\partial t} + u\frac{\partial u}{\partial z} + \frac{1}{\rho}\frac{\partial p}{\partial z} + f = 0$ (11)

$f = \frac{\lambda}{2d\rho}u|u|$ $\lambda = \frac{64}{Re}$ $Re < 2.5\times10^3$ $\lambda = 0.3164 Re^{-0.25}$ $Re \geq 2.5\times10^3$ ENERGY EQUATION $\Delta E_S = E_1 - E_2 + L_1 - L_2 + Q$ (12)

FIG. 12C

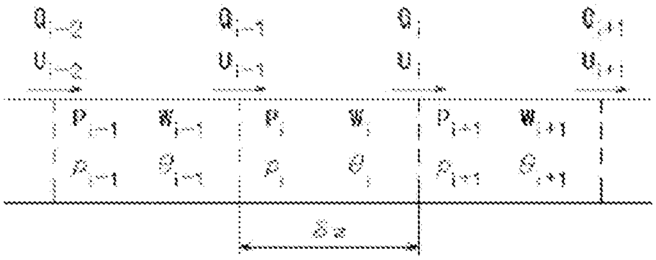

DISCRETE PIPELINE MODEL

FIG. 12D

DISCRETIZATION OF BASIC EQUATIONS

CONTINUITY EQUATION $\frac{\partial w_i}{\partial t} = G_{i-1} - G_i$ $G = \rho A u$ (13)

STATE EQUATION $\frac{dP_i}{dt} = \frac{R\theta_i}{V}(G_{i-1} - G_i) + \frac{Rw_i}{V}\frac{d\theta_i}{dt}$ (14)

MOTION EQUATION $\frac{\partial u}{\partial t} = \frac{P_i - P_{i+1}}{\bar{\rho}\partial z} - \frac{\lambda}{2d}u_i|u_i| - |u_i|\frac{\partial u_i}{\partial z}$ (15)

$\bar{\rho} = \frac{\rho_i + \rho_{i+1}}{2}$ $\frac{\partial u_i}{\partial z} = \frac{u_{i-1} - u_{i+1}}{2\partial z}$

ENERGY EQUATION $$\frac{d\theta_i}{dt} = \frac{1}{C_v w_i}\left\{E_1 - E_2 + L_1 - L_2 + Q - \frac{d}{dt}\left[\frac{1}{2}C_I w_i\left(\frac{u_{i-1} - u_i}{2}\right)^2\right]\right\} \quad (16)$$

FIG. 13

| [SYMBOL] | |
|---|---|
| C | VISCOUS FRICTION COEFFICIENT |
| Cv | SPECIFIC HEAT AT CONSTANT VOLUME |
| d | INNER DIAMETER OF PIPELINE |
| Fq | MAXIMUM STATIC FRICTION FORCE |
| G | MASS FLOW RATE |
| h | HEAT TRANSFER COEFFICIENT |
| M | LOAD MASS |
| P | PRESSURE |
| Pa | ATMOSPHERIC PRESSURE |
| Ps | SUPPLY PRESSURE |
| $S_h$ | HEAT TRANSFER AREA |
| t | TIME |
| u | FLOW VELOCITY INSIDE PIPE |
| V | VOLUME |
| w | AIR MASS |
| z | COORDINATE OF PIPELINE |
| $\theta$ | TEMPERATURE |
| $\theta$a | ATMOSPHERIC TEMPERATURE |
| $\kappa$ | RATIO OF SPECIFIC HEATS |
| ΔEs | ENERGY NEWLY ACCUMULATED IN SYSTEM |
| E1, E2 | TOTAL ENERGY ENTERING AND LEAVING THROUGH FLUID |
| L1, L2 | FLOW WORK CONDUCTED ON SYSTEM AND OUTSIDE BY FLUID |
| Q | ENERGY ENTERING BY HEAT TRANSFER |
| L | PIPE LENGTH, FLOW WORK CONDUCTED ON SYSTEM AND OUTSIDE BY FLUID |
| P1 | PRESSURE DOWNSTREAM OF THROTTLE |
| Ph | PRESSURE UPSTREAM OF THROTTLE |
| $t_{req}$ | SPECIFIED RESPONSE TIME |
| A | EFFECTIVE FLOW PATH AREA |
| b | CRITICAL PRESSURE RATIO |
| C | SONIC CONDUCTANCE |
| p | ABSOLUTE STATIC PRESSURE |
| $q_m$ | MASS FLOW RATE |
| $q_v$ | VOLUME FLOW RATE CONVERTED INTO STANDARD CONDITION |
| R | GAS CONSTANT |
| s | COMPRESSION EFFICIENCY COEFFICIENT |
| T | ABSOLUTE TEMPERATURE |
| Δp | PRESSURE DROP ($p_1$−$p_2$) |
| $\rho$ | DENSITY |

| [SUBSCRIPT] | |
|---|---|
| d | DISCHARGE SIDE |
| u | CHARGE SIDE |
| p | PIPELINE |

FLUID CIRCUIT SELECTION SYSTEM AND FLUID CIRCUIT SELECTION METHOD

TECHNICAL FIELD

The present invention relates to a fluid circuit selection system (selection system for hydraulic circuits) and a fluid circuit selection method (selection method for hydraulic circuits) for, for example, fluid circuits of air cylinders.

BACKGROUND ART

A fluid pressure cylinder drive device described in Japanese Laid-Open Patent Publication No. 2018-054117 has the object of reducing the time required to return a fluid pressure cylinder as much as possible while saving energy by reusing exhaust pressure to return the fluid pressure cylinder and, at the same time, of simplifying a circuit for returning the fluid pressure cylinder by reusing the exhaust pressure.

To solve the above-described problems, the fluid pressure cylinder drive device described in Japanese Laid-Open Patent Publication No. 2018-054117 includes a switching valve, a high-pressure air supply source, an exhaust port, and a check valve. When the switching valve is in a first position, a head-side cylinder chamber communicates with the high-pressure air supply source, and a rod-side cylinder chamber communicates with the exhaust port. When the switching valve is in a second position, the head-side cylinder chamber communicates with the rod-side cylinder chamber via the check valve and, at the same time, with the exhaust port.

SUMMARY OF INVENTION

To achieve an energy-saving fluid circuit that reuses exhaust air as is the fluid pressure cylinder drive device described in Japanese Laid-Open Patent Publication No. 2018-054117, the sizes of instruments need to be appropriately selected; otherwise the requirements and specifications are difficult to satisfy.

That is, the performance of such an energy-saving fluid circuit that reuses exhaust air may deteriorate due to the sizes of various instruments (fluid control valves, pipes, check valves, pilot check valves, valves, silencers, tanks, and the like).

The present invention has been devised taking into consideration the aforementioned circumstances, and has the object of providing a fluid circuit selection system and a fluid circuit selection method enabling selection of appropriate sizes of drive units used in an energy-saving fluid circuit that reuses exhaust air.

[1] According to a first aspect of the present invention, a fluid circuit selection system for a fluid circuit including at least a cylinder and a plurality of instruments connected to the cylinder comprises:

a cylinder selection section configured to select the cylinder;

a database including information about combinations of the plurality of instruments registered in advance at least in order of size;

a combination selection section configured to read the information about the combinations of the plurality of instruments from the database in order of size to select the instruments; and a reselection section configured to reselect the instruments of larger sizes in a case where a stroke time obtained from a simulation performed using part of the instruments selected by the combination selection section exceeds a preset maximum stroke time or in a case where a pressure after a return process obtained from the simulation is less than or equal to a minimum working pressure.

[2] According to a second aspect of the present invention, a fluid circuit selection system for a fluid circuit including at least a cylinder and a plurality of instruments connected to the cylinder comprises:

a cylinder selection section configured to select the cylinder;

a database including information about combinations of the plurality of instruments registered in advance at least in order of size;

a combination selection section configured to read the information about the combinations of the plurality of instruments from the database in order of size to select the instruments;

a first reselection section configured to reselect the instruments of larger sizes in a case where a stroke time obtained from a simulation performed using part of the instruments selected by the combination selection section exceeds a preset maximum stroke time or in a case where a pressure after a return process obtained from the simulation is less than or equal to a minimum working pressure; and a second reselection section configured to reselect the instruments of larger sizes in a case where a stroke time obtained from a simulation performed using all the selected instruments exceeds the preset maximum stroke time or in a case where a pressure after the return process obtained using the currently selected instruments is greater than or equal to a pressure after the return process obtained using previously selected instruments.

[3] According to a third aspect of the present invention, a fluid circuit selection method for a fluid circuit including at least a cylinder and a plurality of instruments connected to the cylinder comprises:

a cylinder selection step of selecting the cylinder;

a combination selection step of reading information about combinations of the plurality of instruments in order of size from a database including the information about the combinations of the plurality of instruments registered in advance at least in order of size, to select the instruments; and a reselection step of reselecting the instruments of larger sizes in a case where a stroke time obtained from a simulation performed using part of the instruments selected in the combination selection step exceeds a preset maximum stroke time or in a case where a pressure after a return process obtained from the simulation is less than or equal to a minimum working pressure.

[4] According to a fourth aspect of the present invention, a fluid circuit selection method for a fluid circuit including at least a cylinder and a plurality of instruments connected to the cylinder comprises:

a cylinder selection step of selecting the cylinder;

a combination selection step of reading information about combinations of the plurality of instruments in order of size from a database including the information about the combinations of the plurality of instruments registered in advance at least in order of size, to select the instruments;

a first reselection step of reselecting the instruments of larger sizes in a case where a stroke time obtained from a simulation performed using part of the instruments selected in the combination selection step exceeds a preset maximum stroke time or in a case where a pressure after a return process obtained from the simulation is less than or equal to a minimum working pressure; and a second reselection step of reselecting the instruments of larger sizes in a case where a stroke time obtained from a simulation performed using all the selected instruments exceeds the preset maximum stroke time or in a case where a pressure after the return process obtained using the currently selected instruments is greater than or equal to a pressure after the return process obtained using previously selected instruments.

According to the present invention, the sizes of drive units used in an energy-saving fluid circuit that reuses exhaust air can be appropriately selected.

BRIEF DESCRIPTION OF DRAWINGS

FIG. 7A illustrates an example breakdown of a cylinder database, FIG. 7B illustrates an example breakdown of a pipe database, and FIG. 7C illustrates an example breakdown of a tank database;

FIG. 8A illustrates an example breakdown of a speed control valve database, FIG. 8B illustrates an example breakdown of a check valve database, FIG. 8C illustrates an example breakdown of a valve database, and FIG. 8D illustrates an example breakdown of a silencer database;

FIG. 9 illustrates an example breakdown of an instrument combination database;

FIG. 10 illustrates an example breakdown of a second instrument combination database;

FIG. 11A illustrates a physical model of a cylinder drive system, FIG. 11B illustrates basic equations for a throttle, and FIG. 11C illustrates basic equations for a cylinder;

FIG. 12A illustrates a pipeline model used for characteristic calculations, FIG. 12B illustrates basic equations for a pipeline, FIG. 12C illustrates a discrete pipeline model of an ith element, which is one of n elements obtained by dividing the pipeline into n, and FIG. 12D illustrates basic equations for the ith element of the discrete pipeline model;

FIG. 13 illustrates symbols and subscripts of the basic equations illustrated in FIGS. 11A to 11C and 12A to 12D;

DESCRIPTION OF EMBODIMENT

A preferred embodiment of a fluid circuit selection system and a fluid circuit selection method according to the present invention will be described in detail below with reference to the accompanying drawings.

A fluid circuit selection system (hereinafter referred to as "selection system 100") according to this embodiment will be described with reference to FIGS. 1A to 19.

The selection system 100 selects the sizes of drive units, which are used in an energy-saving fluid circuit that reuses exhaust air, based on data about the sizes of cylinders, tubes, instruments, and the like stored in various databases.

Examples of the energy-saving fluid circuit, which reuses exhaust air and serves as an object to be selected, will now be described with reference to FIGS. 1A to 5B.

Figure 1A:
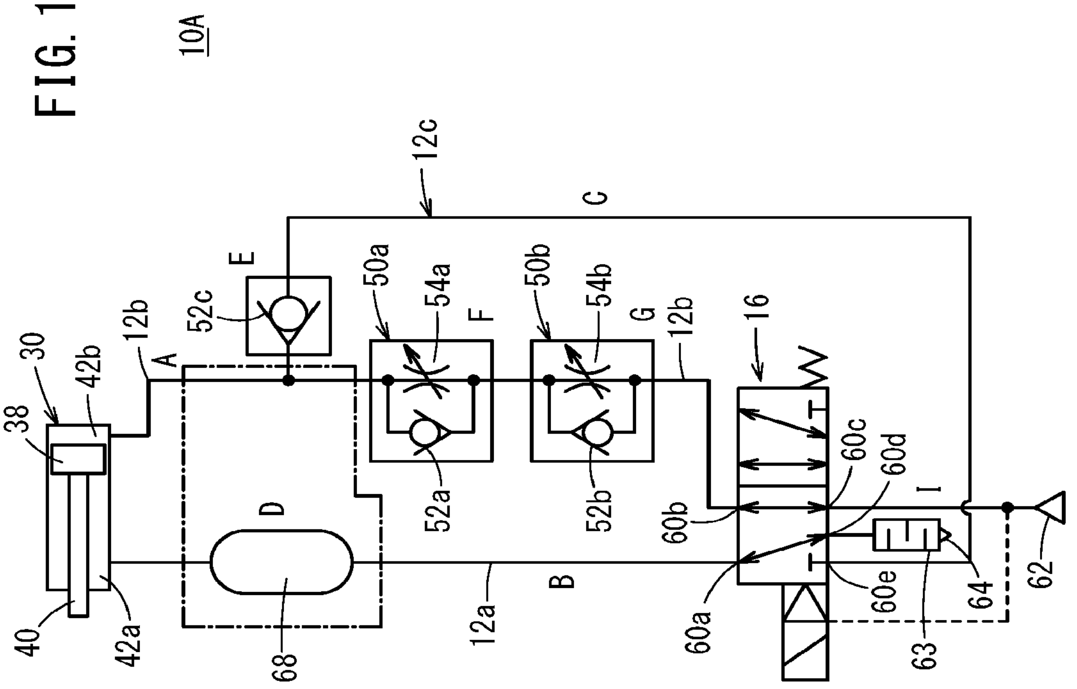
FIG. 1A is a circuit diagram when a valve of a first fluid circuit is in a first state.

First, as illustrated in FIG. 1A, a first fluid circuit 10A includes a first pipe 12*a* (B), a second pipe 12*b* (A), and a valve 16 (H).

Figure 3:
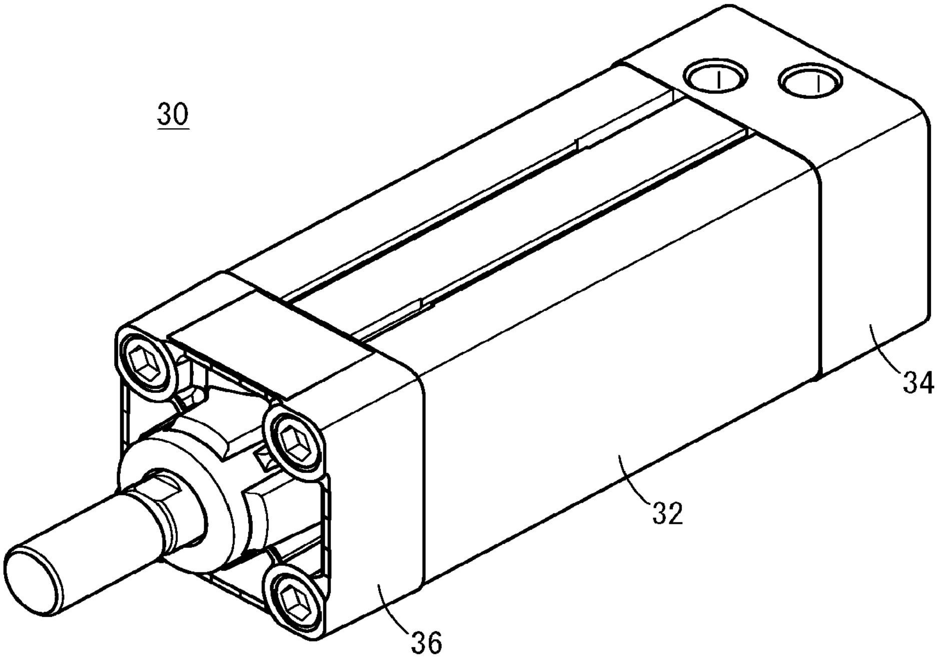
FIG. 3 is a perspective view of an example external appearance of a cylinder.

A cylinder 30 includes a cylinder tube 32, a head cover 34, and a rod cover 36 as illustrated in FIG. 3, and a piston 38, a piston rod 40, and other components as illustrated in FIG. 1A. A first end of the cylinder tube 32 is closed by the rod cover 36, and a second end of the cylinder tube 32 is closed by the head cover 34. The piston 38 (see FIG. 1A) is disposed inside the cylinder tube 32 to be reciprocable. As illustrated in FIG. 1A, for example, the interior space of the cylinder tube 32 is partitioned into a first air chamber 42*a* formed between the piston 38 and the rod cover 36, and a second air chamber 42*b* formed between the piston 38 and the head cover 34.

The piston rod 40 connected to the piston 38 passes through the first air chamber 42*a*, and an end part of the piston rod 40 extends to the outside through the rod cover 36. The cylinder 30 performs tasks such as positioning of workpieces (not illustrated) while pushing out the piston rod 40 (while the piston rod 40 extends), and does not perform any tasks while retracting the piston rod 40.

The first pipe 12*a* (B) is disposed between the first air chamber 42*a* of the cylinder 30 and the valve 16 (H). The second pipe 12*b* (A) is disposed between the second air chamber 42*b* of the cylinder 30 and the valve 16 (H).

Two speed control valves (a first speed control valve 50*a* (F) and a second speed control valve 50*b* (G)) are disposed on certain points on the second pipe 12*b* (A). The first speed control valve 50*a* (F) is an adjustable throttle valve of a so-called meter-out type and allows manual adjustment of the flow rate of air discharged from the second air chamber 42*b*. On the other hand, the second speed control valve 50*b* (G) is an adjustable throttle valve of a so-called meter-in type and allows manual adjustment of the flow rate of air supplied to the second air chamber 42*b*. For the air accumulated in the second air chamber 42*b*, the ratio of the amount of air supplied to the first air chamber 42*a* to the amount of air discharged to the outside can be adjusted by operating the first speed control valve 50*a* (F).

The first speed control valve 50*a* (F) includes a first check valve 52*a* and a first throttle valve 54*a* connected in parallel. The first check valve 52*a* allows air to flow toward the second air chamber 42*b* of the cylinder 30 via the valve 16 (H) and stops air flowing from the second air chamber 42*b* of the cylinder 30 toward the valve 16 (H). The first throttle valve 54*a* adjusts the flow rate of air flowing from the second air chamber 42*b* of the cylinder 30 toward the valve 16 (H).

The second speed control valve 50*b* includes a second check valve 52*b* and a second throttle valve 54*b* connected in parallel. The second check valve 52*b* allows air to flow from the second air chamber 42*b* of the cylinder 30 toward the valve 16 (H) and stops air flowing toward the second air chamber 42*b* of the cylinder 30 via the valve 16 (H). The second throttle valve 54*b* adjusts the flow rate of air flowing toward the second air chamber 42*b* of the cylinder 30 via the valve 16 (H).

In the first fluid circuit 10A, a third check valve 52*c* (E) is connected to a point on the second pipe 12*b* (A) between the cylinder 30 and the first speed control valve 50*a* (F). The third check valve 52*c* (E) allows air to flow from the second pipe 12*b* (A) toward the valve 16 (H) and stops air flowing from the valve 16 (H) toward the second pipe 12*b* (A).

On the other hand, the valve 16 (H) is configured as a 5-port, 2-position solenoid valve having a first port 60*a* to a fifth port 60*e* and switchable between a first position and a second position. The first port 60*a* is connected to the first pipe 12*a* (B). The second port 60*b* is connected to the second pipe 12*b* (A). The third port 60*c* is connected to an air supply source 62. The fourth port 60*d* is connected to an exhaust port 64 with a silencer 63 (I) attached thereto. The fifth port 60*e* is connected to the third check valve 52*c* (E) described above. Moreover, the first port 60*a* is connected to the fourth port 60*d*, and the second port 60*b* is connected to the third port 60*c*. A third pipe 12*c* (C) extending from the third check valve 52*c* (E) to the fifth port 60*e* of the valve 16 (H) functions as one air storage.

As illustrated in FIG. 1A, when the valve 16 (H) is in the first position, the first port 60*a* is connected to the fourth port 60*d*, and the second port 60*b* is connected to the third port 60*c*. On the other hand, as illustrated in FIG. 2A, when the valve 16 (H) is in the second position, the first port 60*a* is connected to the fifth port 60*e*, and the second port 60*b* is connected to the fourth port 60*d*.

The valve 16 (H) is held in the second position by the biasing force of a spring while being de-energized, and switches from the second position to the first position when energized. The valve 16 (H) is energized in response to a command to energize (energization) issued to the valve 16 (H) by a PLC (Programmable Logic Controller; not illustrated), which is a higher level device, and is de-energized in response to a command to stop energizing (de-energization).

The valve 16 (H) is in the first position during the drive process of the cylinder 30, in which the piston rod 40 is pushed out, and is in the second position during the return process of the cylinder 30, in which the piston rod is retracted.

A tank 68 (D) is disposed on a point on the first pipe 12*a* (B). The tank 68 (D) has a large volume to function as an air tank that accumulates air.

FIGS. 1A to 2B conceptually illustrate the first fluid circuit 10A using circuit diagrams. Some flow paths incorporated in the cylinder 30 are drawn as if the flow paths were disposed outside the cylinder 30 for convenience.

In practice, the section enclosed by alternate long and short dash lines in FIG. 1A, that is, part of the second pipe 12*b* (A) including the third check valve 52*c* and part of the first pipe 12*a* (B) including the tank 68 (D) are incorporated in the cylinder 30.

Moreover, for example, the first pipe 12*a* (B) in the section enclosed by the alternate long and short dash lines in FIG. 1A extends through the rod cover 36, the cylinder tube 32, and the head cover 34 as illustrated in FIG. 3. The part of the section disposed inside the cylinder tube 32 corresponds to the tank 68 (D). For example, the cylinder tube 32 may have a double-layered structure including an inner tube and an outer tube so that the space left between the inner and outer tubes serves as the tank 68 (D).

The first fluid circuit 10A is basically configured as above. The effects thereof will now be described with reference to FIGS. 1A to 2B. A state where the piston rod is retracted the most while the valve 16 (H) is in the first position as illustrated in FIG. 1A is defined as an initial state.

Figure 1B:
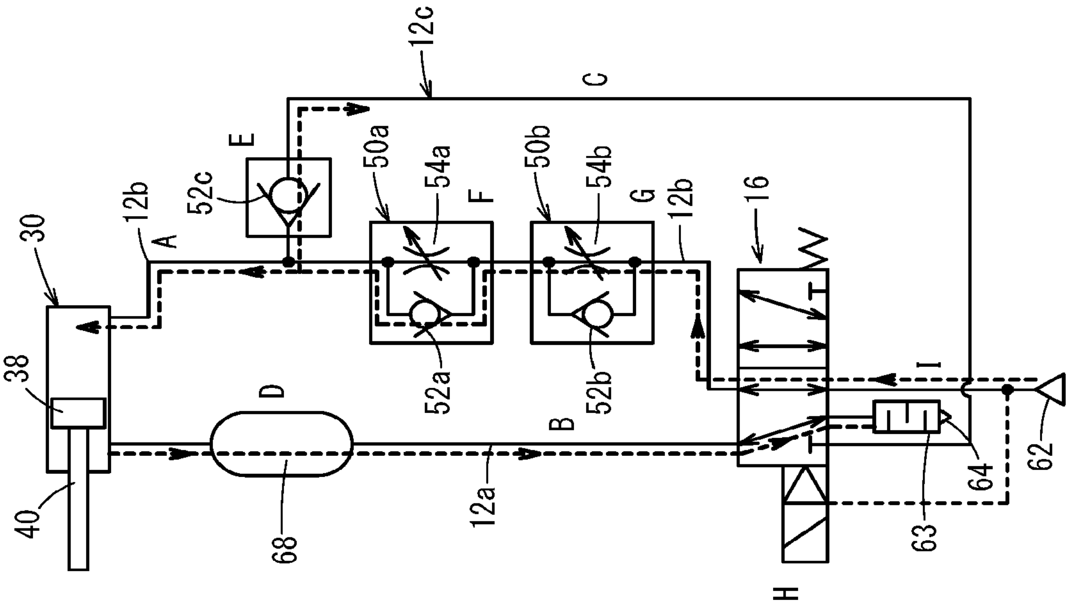
FIG. 1B illustrates a state of the first fluid circuit during a drive process.

First, as illustrated in FIGS. 1A and 1B, during the drive process, air from the air supply source 62 is supplied to the second air chamber 42*b* via the second pipe 12*b* (A) in the initial state. This causes air inside the first air chamber 42*a* to be discharged from the exhaust port 64 to the outside via the first pipe 12*a* (B). At this moment, air passes through the second speed control valve 50*b* (G) while the flow rate is adjusted by the second throttle valve 54*b*, and then is supplied to the second air chamber 42*b* via the first check valve 52*a* of the first speed control valve 50*a* (F). The air from the air supply source 62 is also supplied from the second pipe 12*b* (A) to the third pipe 12*c* (C) via the third check valve 52*c* (E).

This causes the pressure in the second air chamber 42*b* to start increasing and the pressure in the first air chamber 42*a* to start dropping. When the pressure in the second air chamber 42*b* exceeds the pressure in the first air chamber 42*a* by an amount to overcome static frictional resistance of the piston 38, the piston rod 40 starts moving in a push-out direction. Then, as illustrated in FIG. 1B, the piston rod 40 extends to the maximum position and is held in the position by a large thrust.

Figure 2B:
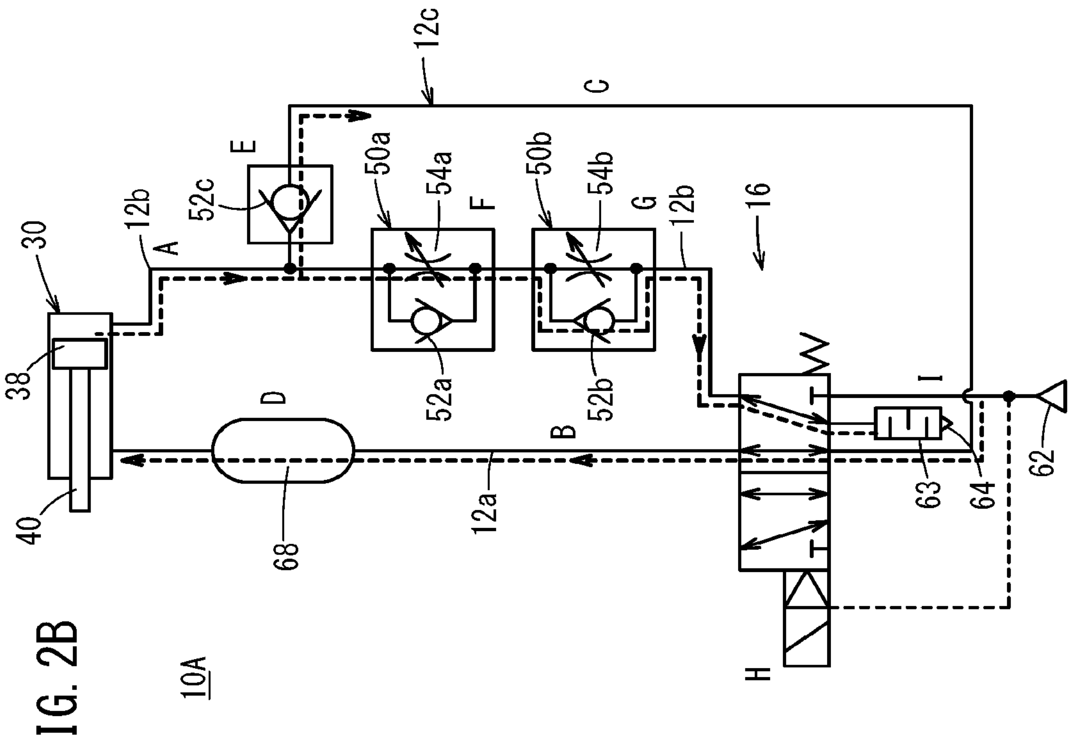
FIG. 2B illustrates a state of the first fluid circuit during a return process.
Figure 2A:
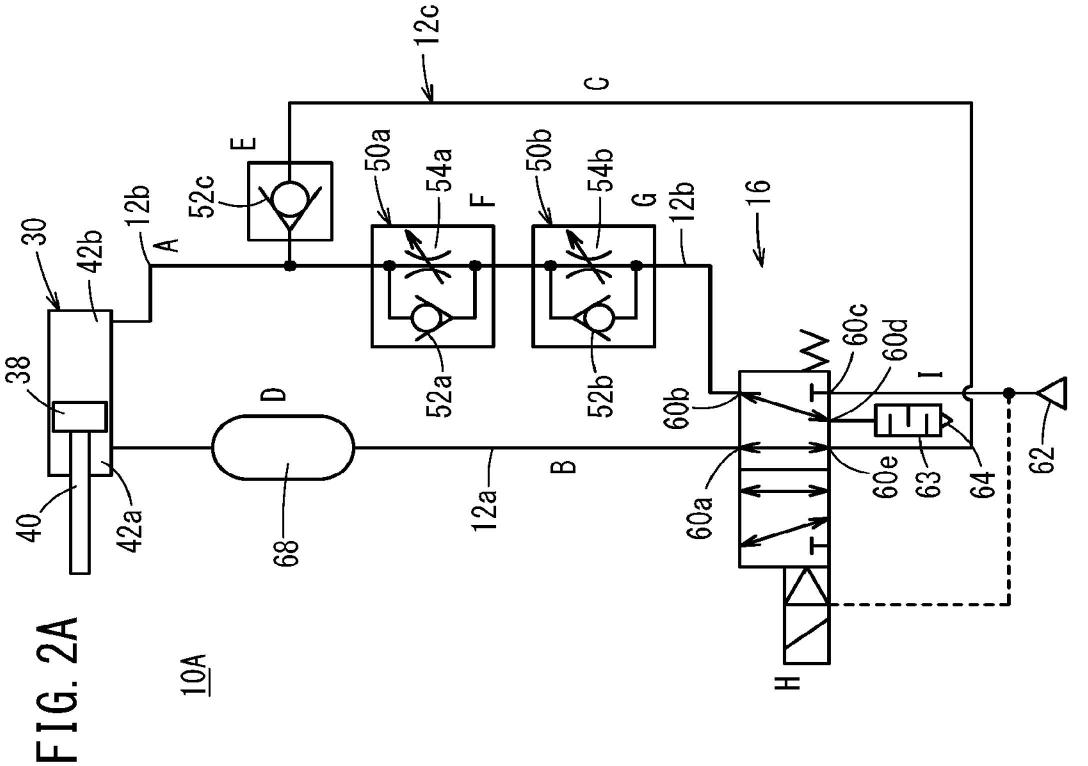
FIG. 2A is a circuit diagram when the valve of the first fluid circuit is in a second state.

After the piston rod 40 extends and a task such as positioning of a workpiece is performed, the valve 16 (H) is switched from the first position to the second position as illustrated in FIGS. 2A and 2B. That is, the return process of the piston rod 40 starts.

During the return process, part of the air accumulated in the second air chamber 42*b* passes through the third check valve 52*c* (E) and flows toward the first air chamber 42*a*. At the same time, another part of the air accumulated in the second air chamber 42*b* is discharged from the exhaust port 64 via the first speed control valve 50*a* (F), the second speed control valve 50*b* (G), and the valve 16 (H). At this moment, air passes through the first speed control valve 50*a* (F) while the flow rate is adjusted by the first throttle valve 54*a*, and then flows toward the valve 16 (H) via the second check valve 52*b* of the second speed control valve 50*b* (G).

On the other hand, the air supplied toward the first air chamber 42*a* is accumulated mainly in the tank 68 (D). This is because the tank 68 (D) occupies the largest space in an area where air can exist between the third check valve 52*c* (E) and the first air chamber 42*a* including the first air chamber 42*a* and the pipes path before retraction of the piston rod 40 starts.

Subsequently, the air pressure in the second air chamber 42*b* decreases while the air pressure in the first air chamber 42*a* increases. When the air pressure in the first air chamber 42*a* becomes higher than the air pressure in the second air chamber 42*b* by a predetermined amount or more, retraction of the piston rod 40 starts. Then, the first fluid circuit 10A returns to its initial state where the piston rod 40 is retracted the most.

Figure 4B:
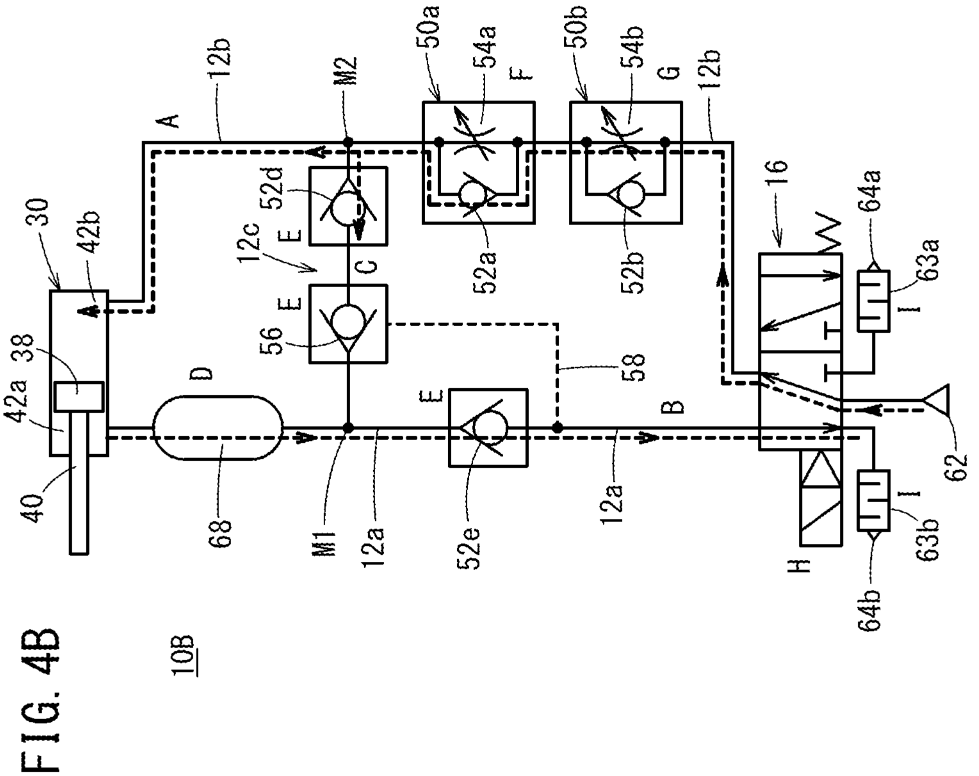
FIG. 4B illustrates a state of the second fluid circuit during a drive process.
Figure 4A:
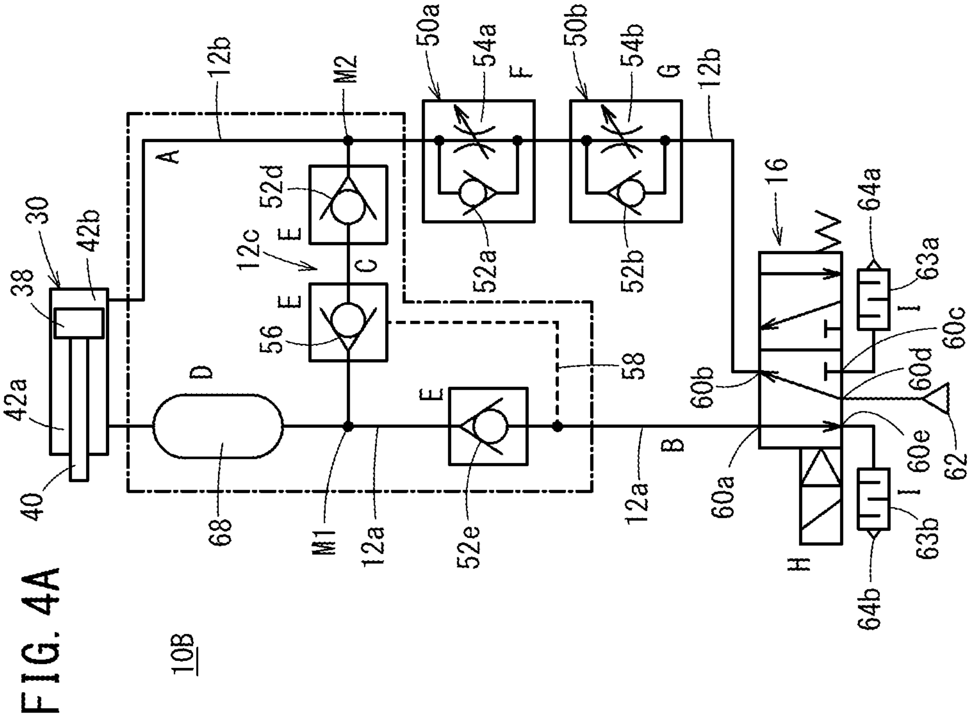
FIG. 4A is a circuit diagram when a valve of a second fluid circuit is in a first state.

Next, as illustrated in FIG. 4A, a second fluid circuit 10B has a structure similar to the structure of the first fluid circuit 10A described above, except that the third pipe 12*c* (C) is disposed between a point M1 on the first pipe 12*a* (B) and a point M2 on the second pipe 12*b* (A).

That is, in the second fluid circuit 10B, the third pipe 12*c* (C: bypass path) branches off from a point on the first pipe 12*a* (B) and the third pipe 12*c* (C) joins the second pipe 12*b* (A) at a point on the second pipe 12*b* (A). That is, the third pipe (C) is disposed between the point M1 on the first pipe 12*a* (B) and the point M2 on the second pipe 12*b* (A).

The third pipe 12*c* (C) is provided with a fourth check valve 52*d* (E) disposed adjacent to the point M2 on the second pipe 12*b* (A), and a pilot check valve 56 (E) disposed adjacent to the point M1 on the first pipe 12*a* (B). The fourth check valve 52*d* (E) allows air to flow from the second air chamber 42*b* toward the first air chamber 42*a* and stops air flowing from the first air chamber 42*a* toward the second air chamber 42*b*.

The pilot check valve 56 (E) allows air to flow from the first air chamber 42*a* toward the second air chamber 42*b*. Moreover, the pilot check valve 56 (E) stops air flowing from the second air chamber 42*b* toward the first air chamber 42*a* when not subjected to pilot pressure at a predetermined level or more, and allows air to flow from the second air chamber 42*b* toward the first air chamber 42*a* when subjected to pilot pressure at the predetermined level or more. In other words, when not subjected to pilot pressure, the pilot check valve 56 (E) functions as a check valve allowing air to flow from the first air chamber 42*a* toward the second air chamber 42*b* and stopping air flowing from the second air chamber 42*b* toward the first air chamber 42*a*. When subjected to pilot pressure, the pilot check valve 56 (E) does not function as a check valve and allows air to flow in either direction.

A fifth check valve 52*e* (E) is disposed on a point on the first pipe 12*a* (B) between the point M1 on the first pipe 12*a* (B) and the valve 16 (H). The fifth check valve 52*e* (E) allows air to flow from the point M1 on the first pipe 12*a* (B) toward the valve 16 (H) and stops air flowing from the valve 16 (H) toward the point M1 on the first pipe 12*a* (B). A pilot path 58 branches off from the first pipe 12*a* (B) at a point between the fifth check valve 52*e* (E) and the valve 16 (H) and connects to the pilot check valve 56 (E).

The valve 16 (H) in the second fluid circuit 10B is also configured as a 5-port, 2-position solenoid valve having the first port 60*a* to the fifth port 60*e* and switchable between the first position and the second position. The first port 60*a* is connected to the first pipe 12*a* (B). The second port 60*b* is connected to the second pipe 12*b* (A).

The third port 60*c* is connected to a first exhaust port 64*a* with a first silencer 63*a* (I) attached thereto. The fourth port 60*d* is connected to the air supply source 62. The fifth port 60*e* is connected to a second exhaust port 64*b* with a second silencer 63*b* (I) attached thereto.

The section enclosed by alternate long and short dash lines in FIG. 4A, that is, the tank 68 (D), the third pipe 12*c* (C: bypass path) including the fourth check valve 52*d* (E) and the pilot check valve 56 (E), part of the first pipe 12*a* (B) including the fifth check valve 52*e* (E), part of the second pipe 12*b* (A), and the pilot path 58 are incorporated in the cylinder 30.

The second fluid circuit 10B is basically configured as above. The effects thereof will now be described with reference to FIGS. 4A to 5B. A state where the piston rod is retracted the most while the valve 16 (H) is in the first position as illustrated in FIG. 4A is defined as an initial state.

First, as illustrated in FIGS. 4A and 4B, during the drive process, air from the air supply source 62 is supplied to the second air chamber 42*b* via the second pipe 12*b* (A) in the initial state. This causes air inside the first air chamber 42*a* to be discharged from the second exhaust port 64*b* to the outside via the first pipe 12*a* (B). At this moment, air passes through the second speed control valve 50*b* (G) while the flow rate is adjusted by the second throttle valve 54*b*, and then is supplied to the second air chamber 42*b* via the first check valve 52*a* of the first speed control valve 50*a* (F).

This causes the pressure in the second air chamber 42*b* to start increasing and the pressure in the first air chamber 42*a* to start dropping. When the pressure in the second air chamber 42*b* exceeds the pressure in the first air chamber 42*a* by an amount to overcome static frictional resistance of the piston 38, the piston rod 40 starts moving in the push-out direction. Then, as illustrated in FIG. 4B, the piston rod 40 extends to the maximum position and is held in the position by a large thrust.

Figure 5A:
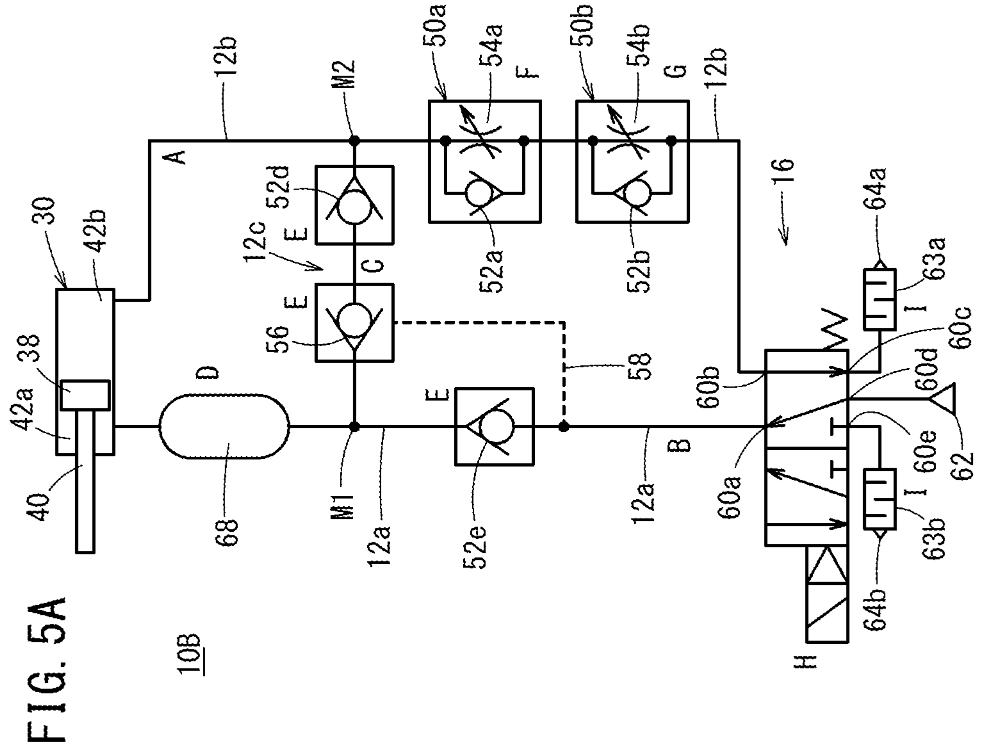
FIG. 5A is a circuit diagram when the valve of the second fluid circuit is in a second state.
Figure 5B:
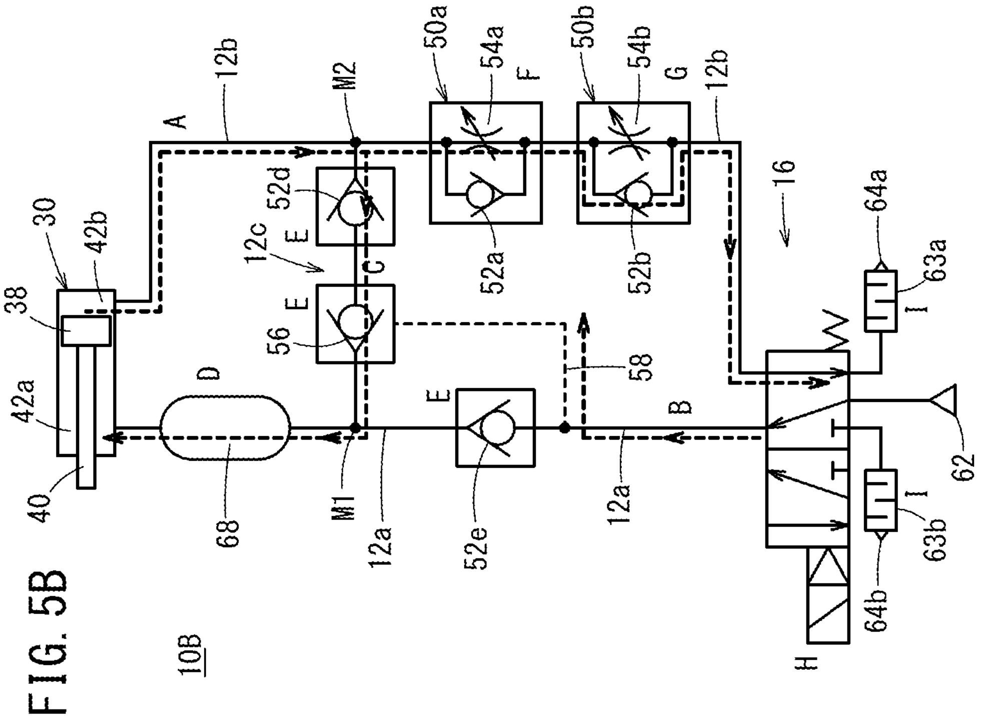
FIG. 5B illustrates a state of the second fluid circuit during a return process.

After the piston rod 40 extends and a task such as positioning of a workpiece is performed, the valve 16 (H) is switched from the first position to the second position as illustrated in FIG. 5A. That is, the return process of the piston rod 40 starts.

During the return process, air from the air supply source 62 flows into part of the first pipe 12*a* (B) between the fifth check valve 52*e* (E) and the valve 16 (H). The pressure of the air inside the part of the first pipe 12*a* (B) increases as the fifth check valve 52*e* (E) blocks the air flow. Then, the pressure in the pilot path 58 connected to the first pipe 12*a* (B) becomes higher than or equal to a predetermined level, causing the pilot check valve 56 (E) to stop functioning as a check valve.

When the pilot check valve 56 (E) stops functioning as a check valve, part of the air accumulated in the second air chamber 42*b* passes through the third pipe 12*c* (C: bypass path) including the fourth check valve 52*d* (E) and the pilot check valve 56 (E) via the point M2 on the second pipe 12*b* (A), and is supplied toward the first air chamber 42*a* from the point M1 on the first pipe 12*a* (B). At the same time, another part of the air accumulated in the second air chamber 42*b* is discharged from the first exhaust port 64*a* to the outside via the second pipe 12*b* (A). At this moment, air passes through the first speed control valve 50*a* (F) while the flow rate is adjusted by the first throttle valve 54*a*, and then flows toward the valve 16 via the second check valve 52*b* of the second speed control valve 50*b* (G). This causes the pressure in the second air chamber 42*b* to start dropping and the pressure in the first air chamber 42*a* to start increasing. At this moment, the air supplied toward the first air chamber 42*a* is accumulated mainly in the tank 68 (D).

The pressure in the second air chamber 42*b* decreases while the pressure in the first air chamber 42*a* increases. When the pressure in the second air chamber 42*b* becomes equal to the pressure in the first air chamber 42*a*, supply of the air in the second air chamber 42*b* toward the first air chamber 42*a* stops due to the effect of the fourth check valve 52*d* (E). This causes the pressure in the first air chamber 42*a* to stop increasing. On the other hand, the pressure in the second air chamber 42*b* continues to drop. When the pressure in the first air chamber 42*a* exceeds the pressure in the second air chamber 42*b* by an amount to overcome the static frictional resistance of the piston 38, the piston rod 40 starts moving in a retraction direction.

When the piston rod 40 starts moving in the retraction direction, the volume of the first air chamber 42*a* increases, and thus the pressure in the first air chamber 42*a* drops. However, the rate of the pressure drop is slow as the volume of the first air chamber 42*a* is substantially increased by the presence of the tank 68 (D). As the pressure in the second air chamber 42*b* drops at a higher rate than the above, the pressure in the first air chamber 42*a* continues to exceed the pressure in the second air chamber 42*b*. In addition, the sliding resistance of the piston 38 that has once started moving is less than the frictional resistance of the piston 38 at rest. Thus, the piston rod 40 can move in the retraction direction without any difficulty. The second fluid circuit 10B returns to its initial state where the piston rod 40 is retracted the most in this manner. The second fluid circuit 10B is maintained in this state until the valve 16 (H) is switched again.

Next, the selection system 100 according to this embodiment will be described with reference to FIGS. 6 to 19. In the description below, the second pipe 12*b*, the first pipe 12*a*, and the third pipe 12*c* are respectively referred to as a pipe A, a pipe B, and a pipe C. The tank 68 is referred to as a tank D. The first speed control valve 50*a* and the second speed control valve 50*b* are respectively referred to as a speed control valve F and a speed control valve G. The valve 16 is referred to as a valve H. The silencer 63 is referred to as a silencer I. Moreover, each of the third check valve 52*c* applied to the first fluid circuit 10A, and the fourth check valve 52*d*, the fifth check valve 52*e*, and the pilot check valve 56 applied to the second fluid circuit 10B is referred to as a check valve E.

Figure 6:
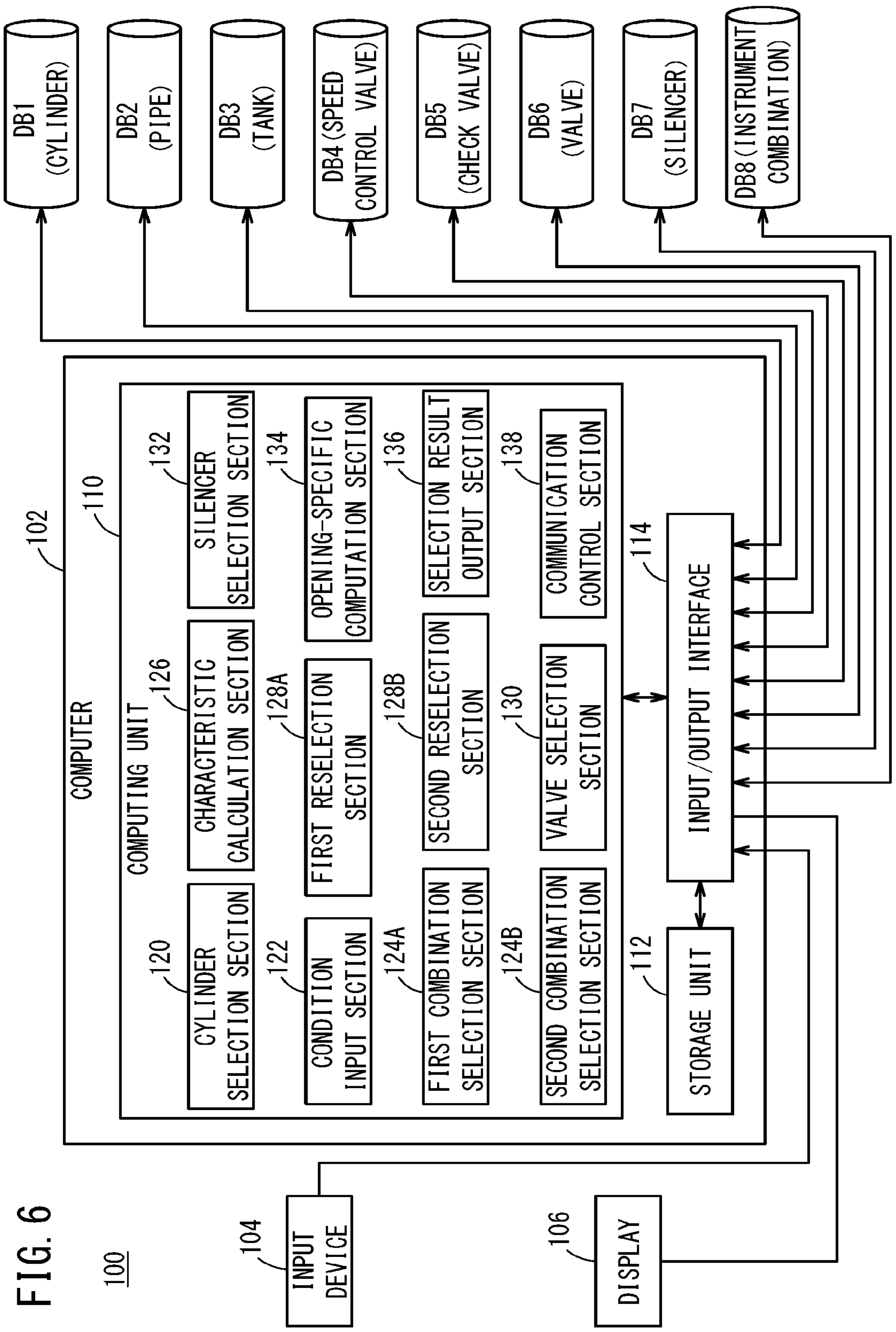
FIG. 6 is a block diagram illustrating the structure of a fluid circuit selection system according to an embodiment.

As illustrated in FIG. 6, the selection system 100 includes a variety of databases DB1 to DB8, a computer 102, an input device 104 (keyboard, mouse, and other devices), and a display 106.

The variety of databases include, for example, a cylinder database DB1, a pipe database DB2, a tank database DB3, a speed control valve database DB4, a check valve database DB5, a valve database DB6, a silencer database DB7, and an instrument combination database DB8.

The cylinder database DB1 stores data about the cylinder 30 arranged in, for example, ascending order of size (for example, the bore diameter D or the rod diameter d) with the product number attached thereto. As illustrated in FIG. 7A, for example, the data about the cylinder 30 includes the product number, the bore diameter D, the rod diameter d, the sonic conductance CO of a fixed throttle, the static friction force Fs, the kinetic friction force Fd, the viscous friction coefficient, the mass of the rod and the piston, the minimum working pressure Pmin of the cylinder, and other parameters.

The pipe database DB2 stores data about the pipes (pipes A, B, and C) arranged in, for example, ascending order of size (for example, the outer diameters or the inner diameters) and sorted by the product number. As illustrated in FIG. 7B, for example, the data about the pipes includes the product number, the outer diameter De, the inner diameter Di, the material, and other parameters.

The tank database DB3 stores data about the tank D arranged in, for example, ascending order of volume with the product number attached thereto. As illustrated in FIG. 7C, for example, the data about the tank D includes the product number, the volume, the size (the maximum outer diameter and the maximum length), and other parameters.

The speed control valve database DB4 stores data about the speed control valve F and the speed control valve G arranged in, for example, ascending order of size with the product number attached thereto. As illustrated in FIG. 8A, for example, the data about the speed control valves F and G includes the product number, the size, the sonic conductance, and other parameters.

The check valve database DB5 stores data about the check valve E arranged in, for example, ascending order of size with the product number attached thereto. As illustrated in FIG. 8B, for example, the data about the check valve E includes the product number, the size, the sonic conductance, and other parameters.

The valve database DB6 stores data about the valve H arranged in, for example, ascending order of size with the product number attached thereto. As illustrated in FIG. 8C, for example, the data about the valve H includes the product number, the size, the sonic conductance, the response time, and other parameters.

The silencer database DB7 stores data about the silencer I arranged in, for example, ascending order of size with the product number attached thereto. As illustrated in FIG. 8D, for example, the data about the silencer I includes the product number, the size, the sonic conductance, and other parameters.

As illustrated in FIG. 9, for example, the instrument combination database DB8 stores data about the combination of instruments with the combination number attached thereto. When shown along the first fluid circuit 10A illustrated in FIG. 1A and the second fluid circuit 10B illustrated in FIG. 4A, for example, the combination data has a data format in which sizes are arranged to correspond to the pipe A, the pipe B, the pipe C, the tank D, the check valve E, the speed control valve F, and the speed control valve G. Each piece of the combination data is different from others in the size of one instrument.

As to the valve H, the valve H having a flow rate characteristic identical to the flow rate characteristic of the selected speed control valve is selected from the valve database DB6. An operator, for example, performs the selection using the input device 104. Also, the silencer I having a flow rate characteristic twice the flow rate characteristic of the selected speed control valve is selected from the silencer database DB7. The operator, for example, also performs the selection using the input device 104.

As a matter of course, the sizes of the valve H and the silencer I corresponding to the combination number may be registered as in a second instrument combination database DB8*a* illustrated in FIG. 10 in a manner similar to those of the other instruments. In this case, the selection of the valve H and the silencer I by the input from the operator can be omitted since the valve H and the silencer I are automatically selected.

On the other hand, as illustrated in FIG. 6, the computer 102 includes a computing unit 110, a storage unit 112, an input/output interface 114, and other components. The computing unit 110 includes a processor provided with a CPU and the like. The processor executes programs stored in the storage unit 112 to implement various functions.

In this embodiment, the computing unit 110 functions as a cylinder selection section 120, a condition input section 122, a first combination selection section 124A, a second combination selection section 124B, a characteristic calculation section 126, a first reselection section 128A, a second reselection section 128B, a valve selection section 130, a silencer selection section 132, an opening-specific computation section 134, a selection result output section 136, and a communication control section 138.

The storage unit 112 includes, for example, volatile memory and nonvolatile memory. The volatile memory includes, for example, RAM (Random Access Memory), flash memory, and the like.

The cylinder selection section 120 first reads information about, for example, the type of the cylinder (circular, rectangular, thin, with guide, or the like) from the cylinder database DB1 based on the input from an operator, and then displays the information together with the product number of the cylinder on the display 106. The cylinder 30 of a suitable type may be selected from the cylinder database DB1 based on the bore diameter, the cylinder length, and other parameters that have been input, and displayed on the display 106 together with the product number of the cylinder as a matter of course. Furthermore, the cylinder selection section 120 stores the product number of the cylinder input based on the operation of the operator, in the storage unit 112.

The condition input section 122 stores various parameters input through the input device 104, in the storage unit 112 via the communication control section 138. The various parameters include, for example, conditions of use and operating directions (use: transportation, press-fitting, or clamping; installation position and direction during drive process: horizontal and push-out, horizontal and retraction, vertically upward and ascending, or vertically downward and descending), conditions of stroke and pressure (stroke, maximum stroke time Tmax, and supply pressure PS), conditions of pipes (pipe length (left) L1 and pipe length (right) L2), and conditions of load (load mass Mw during drive process, load mass Mr during return process, press-fitting force, and clamping force; external guide: not used, used (roller), used (slider), any, or friction coefficient).

The first combination selection section 124A and the second combination selection section 124B read the combination number from the instrument combination database DB8 in ascending order and then read the data about the pipe A, the pipe B, and the pipe C corresponding to the read combination number from the pipe database DB2. Moreover, the first combination selection section 124A and the second combination selection section 124B read the data about the tank D corresponding to the read combination number from the tank database DB3, and the data about the check valve E corresponding to the read combination number from the check valve database DB5. At this moment, the data about the check valve E corresponding to the third check valve 52*c* is read for the first fluid circuit 10A, and the data about the check valve E corresponding to the fourth check valve 52*d*, the fifth check valve 52*e*, and the pilot check valve 56 is read for the second fluid circuit 10B. Moreover, the first combination selection section 124A and the second combination selection section 124B read the data about the speed control valve F and the speed control valve G corresponding to the read combination number from the speed control valve database DB4. After reading the above-described pieces of data, the first combination selection section 124A and the second combination selection section 124B start the characteristic calculation section 126.

The characteristic calculation section 126 performs simulations to determine various characteristics of the selected cylinder drive system (fluid circuit 10). In the simulations, basic equations for the cylinder 30, the pipe A, the pipe B, the pipe C, the tank D, the check valve E, the speed control valve F, the speed control valve G, and the like illustrated in FIGS. 11A to 11C and FIGS. 12A to 12D are solved by numerical calculations.

That is, the characteristic calculation section 126 performs simulations based on the sizes and the like of the cylinder, the pipes, the tank, the check valve, and the speed control valves described above to determine a stroke time Ts during the drive process and a post-return pressure Pr during the return process. When necessary, the characteristic calculation section 126 performs the numerical calculations by additionally using the valve and the silencer to determine the stroke time Ts during the drive process and the post-return pressure Pr during the return process.

Specifically, the mass flow rate qm at a throttle in a physical model of the cylinder drive system illustrated in FIG. 11A can be expressed by Equations (1a) and (1b) as the basic equations for the throttle in FIG. 11B. More specifically, the mass flow rate is expressed by Equation (aa) in a case of choked flow, that is, when $p2/p1 \leq b$, and expressed by Equation (1b) in a case of subsonic flow, that is, when $p2/p1 > b$.

The mass flow rate at the speed control valves, the valve, the silencer, and other components can be obtained from Equations (1a) and (1b) illustrated in FIG. 11B. In consideration of changes in air temperature, State Equations (2) to (4), Energy Equations (5) to (7), and Motion Equation (8) are given as the basic equations for the cylinder in FIG. 11C.

For a pipeline model in FIG. 12A, the basic equations for the pipeline (pipe) in FIG. 12B are expressed as Continuity Equation (9), State Equation (10), Motion Equation (11), and Energy Equation (12).

For an ith element, which is one of n elements obtained by dividing the pipeline into n as illustrated in FIG. 12C, the basic equations are expressed as Continuity Equation (13), State Equation (14), Motion Equation (15), and Energy Equation (16) as illustrated in FIG. 12D. FIG. 13 provides explanations of symbols and subscripts of the basic equations illustrated in FIGS. 11A to 11C and 12A to 12D.

Figure 14:
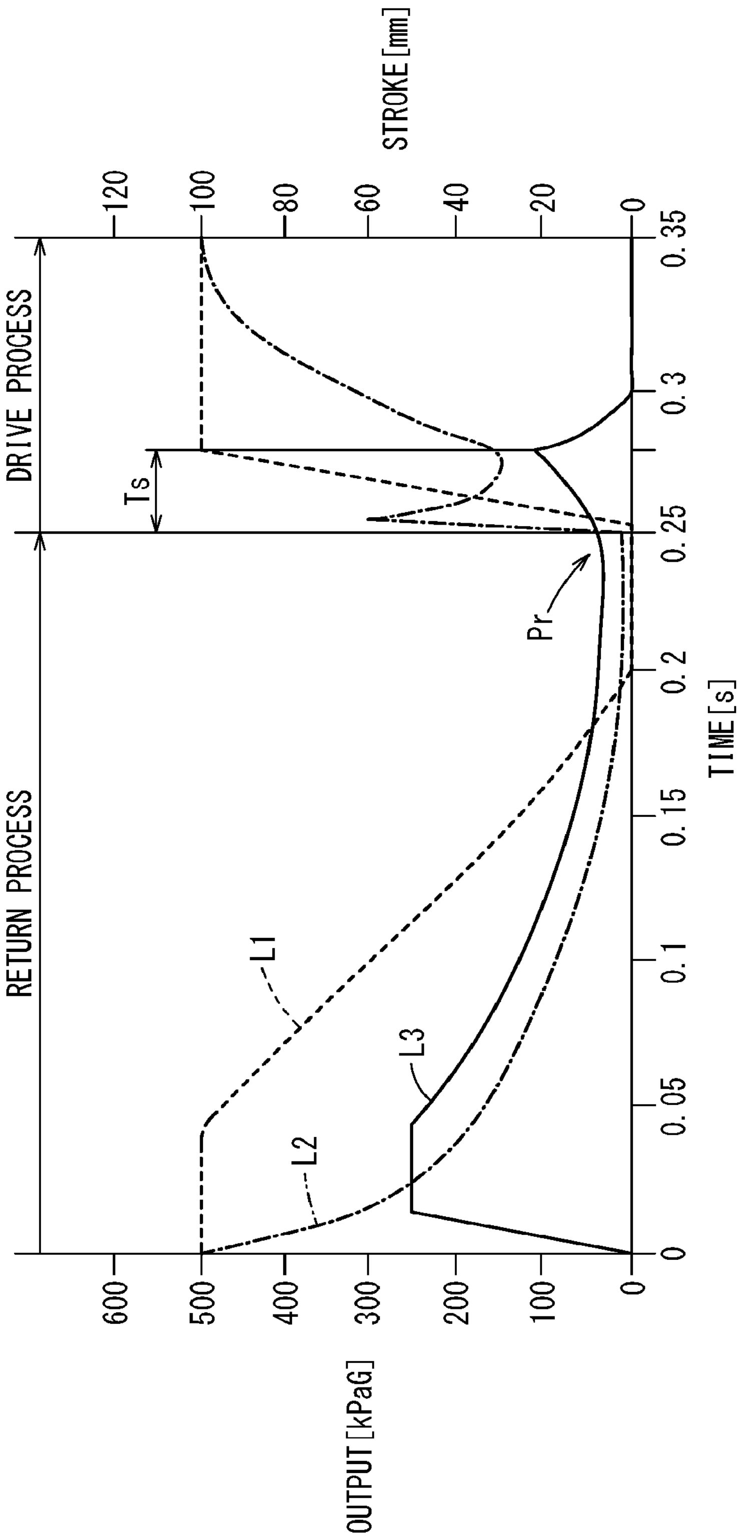
FIG. 14 is a graph illustrating a result of an example simulation calculation by a characteristic calculation section.

FIG. 14 is a graph obtained from a simulation calculation by the characteristic calculation section 126. In FIG. 14, a dotted line L1, an alternate long and short dash line L2, and a solid line L3 respectively indicate the displacement of the piston 38, a head-side pressure in the cylinder 30, and a rod-side pressure in the cylinder 30. Ts denotes the stroke time during the drive process. Pr denotes the post-return pressure during the return process.

On the other hand, in a case where the stroke time Ts obtained from a simulation performed using the selected cylinder 30 and part of the selected instruments exceeds the preset maximum stroke time Tmax, or in a case where the post-return pressure Pr obtained from the simulation is less than or equal to the minimum working pressure Pmin, the first reselection section 128A reselects the instruments of larger sizes. That is, the first reselection section 128A adds one to the index for selection (combination number) used by the first combination selection section 124A and then starts the first combination selection section 124A. The part of the instruments described above includes the pipe A, the pipe B, the pipe C, the tank D, the check valve E, the speed control valve F, and the speed control valve G.

In a case where the stroke time Ts obtained from a simulation performed using all the selected instruments exceeds the preset maximum stroke time Tmax, or in a case where the post-return pressure Pr obtained using the currently selected instruments is greater than or equal to the post-return pressure Pr obtained using the previously selected instruments, the second reselection section 128B reselects the instruments of larger sizes. That is, the second reselection section 128B adds one to the index for selection (combination number) used by the second combination selection section 124B and then starts the second combination selection section 124B.

The valve selection section 130 first reads information about, for example, an external pilot valve circuit (single body-ported type, single base-mounted type, or the like) from the valve database DB6 based on the input from the operator, and then displays the information together with the product number of the valve on the display 106. Furthermore, the valve selection section 130 stores the product number of the valve input based on the operation of the operator, in the storage unit 112.

The silencer selection section 132 selects the silencer I connectable to the valve H selected by the valve selection section 130. The silencer I is selected using, for example, a valve-silencer correspondence table. The valve selection section 130 stores the product number of the selected silencer I in the storage unit 112.

The opening-specific computation section 134 computes the stroke time Ts, the average velocity, the terminal velocity, the kinetic energy and the allowable energy, a 90% thrust establishment time, and the like during the drive process of the piston 38 for each opening of the speed control valve G. Moreover, the opening-specific computation section 134 computes the post-return pressure Pr, the stroke time, the average velocity, the terminal velocity, the kinetic energy and the allowable energy, and the like during the return process of the piston 38 for each opening of the speed control valve F.

The selection result output section 136 outputs the results of selection performed by the above-described selection sections to the display 106 through the communication control section 138 to display the selection results on the display 106.

The selection results include, for example, the product numbers, reduction rate, reduced air consumption, air consumption, results regarding the drive process (speed control valve G), results regarding the return process (speed control valve F), and the lateral load and the allowable lateral load.

The product numbers respectively correspond to the cylinder, the valve, the pipes, the tank, the speed control valves, the check valve, and the silencer that have been selected.

The results regarding the drive process (speed control valve G) include, for example, the stroke time Ts, the average velocity, the terminal velocity, the kinetic energy and the allowable energy, and the 90% thrust establishment time for each opening. The results regarding the return process (speed control valve F) include, for example, the post-return pressure Pr, the stroke time Ts, the average velocity, the terminal velocity, and the kinetic energy and the allowable energy.

Based on instructions from the above-described selection sections and the like, the communication control section 138 downloads data about the cylinder, the pipes, the instruments, and the like from the databases and stores the data in the storage unit 112 via the input/output interface 114. Moreover, the communication control section 138 stores the data input by the input device 104, in the storage unit 112 via the input/output interface 114. Furthermore, the communication control section 138 outputs the data (for example, graph data and table data) stored in the storage unit 112 through the process conducted by the above-described selection sections and the like, to the display 106 via the input/output interface 114.

Next, processing operations of the selection system 100 according to this embodiment will be described with reference to FIGS. 15 to 17.

Figure 15:
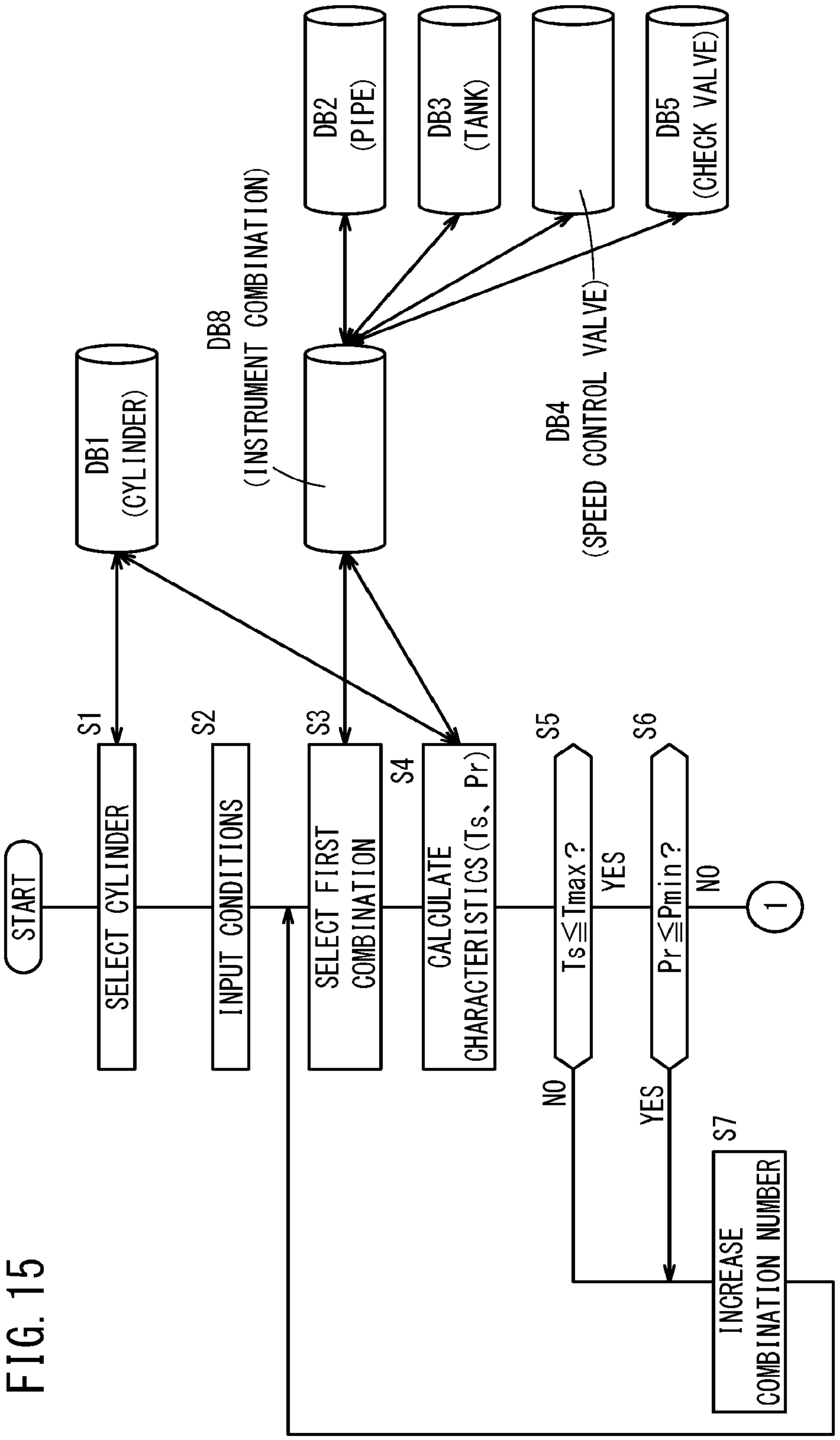
FIG. 15 is a flowchart (1) illustrating processing operations of a selection system.

First, in step S1 in FIG. 15, the cylinder selection section 120 reads the information about, for example, the type of the cylinder (circular, rectangular, thin, with guide, or the like) from the cylinder database DB1 based on the input from an operator, and then displays the information together with the product number of the cylinder on the display 106. The cylinder selection section 120 stores the product number of the cylinder input based on the operation of the operator, in the storage unit 112.

In step S2, the condition input section 122 stores various conditions input through the input device 104, in the storage unit 112 via the communication control section 138.

In step S3, the first combination selection section 124A selects the combination number from the instrument combination database DB8 in ascending order and reads the data about the pipe A, the pipe B, and the pipe C corresponding to the selected combination number from the pipe database DB2. Moreover, the first combination selection section 124A reads the data about the tank D corresponding to the selected combination number from the tank database DB3, and the data about the check valve E corresponding to the selected combination number from the check valve database DB5. Furthermore, the first combination selection section 124A reads the data about the speed control valve F and the speed control valve G corresponding to the selected combination number from the speed control valve database DB4. Subsequently, the first combination selection section 124A starts the characteristic calculation section 126.

In step S4, the characteristic calculation section 126 performs simulations based on the sizes and the like of the cylinder 30, the pipe A, the pipe B, the pipe C, the tank D, the check valve E, the speed control valve F, and the speed control valve G that have been selected, to thereby determine the stroke time Ts during the drive process and the post-return pressure Pr during the return process.

In step S5, the first reselection section 128A determines whether the stroke time Ts obtained in step S4 is less than or equal to the preset maximum stroke time Tmax. If the determination result is positive (YES in step S5), the process proceeds to step S6, and the first reselection section 128A determines whether the post-return pressure Pr is less than or equal to the minimum working pressure Pmin.

If the determination result in step S5 is negative (NO in step S5) or if the determination result in step S6 is positive (YES in step S6), the process proceeds to step S7 to reselect the instruments of larger sizes. That is, the first reselection section 128A adds one to the index for selection (combination number) used by the first combination selection section 124A and then starts the first combination selection section 124A to repeat the process from step S3.

Figure 16:
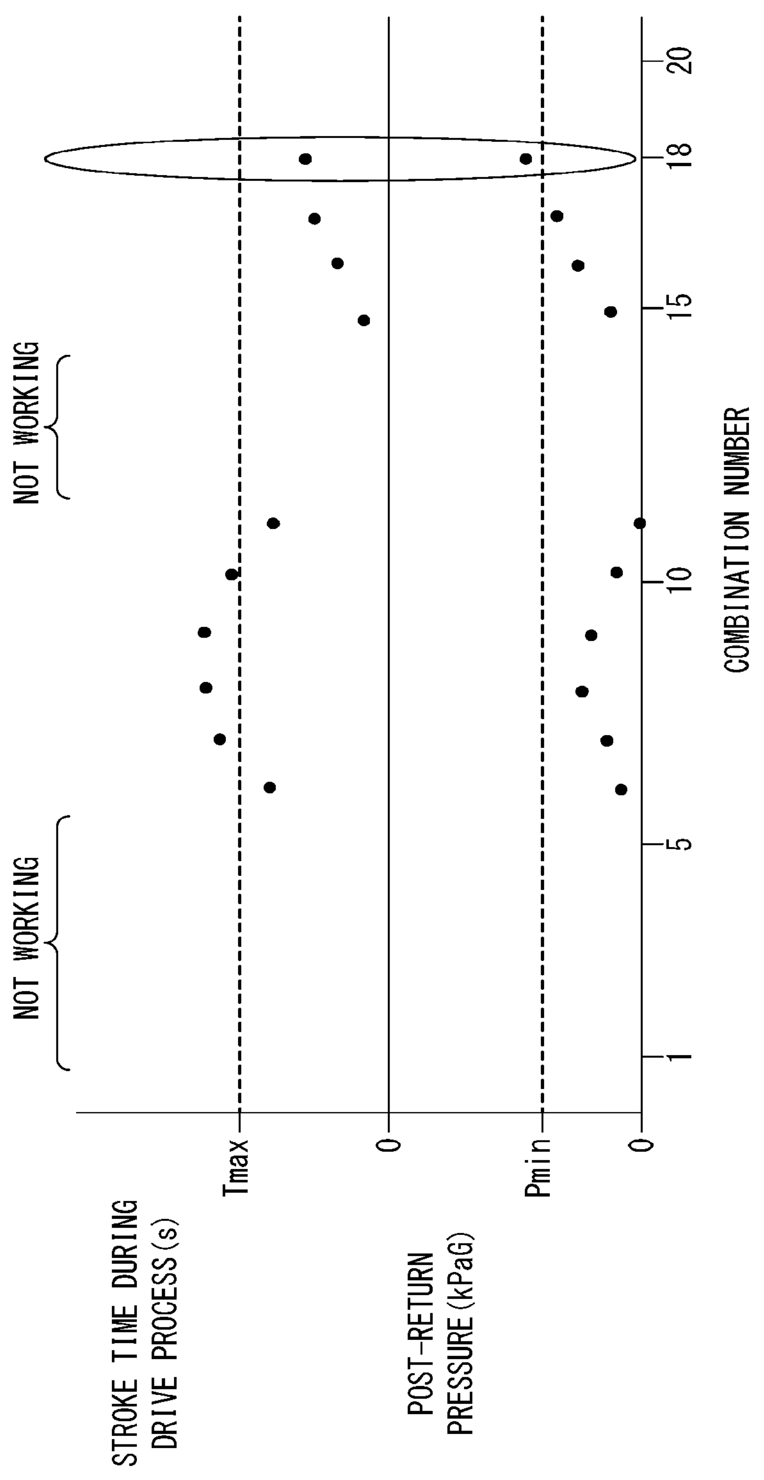
FIG. 16 is a graph illustrating stroke times during the drive process and post-return pressures obtained using instruments of combination numbers 1 to 18.

In the process from steps S3 to S6 described above, the instruments are selected as illustrated in, for example, FIG. 16. That is, for example, the instruments of the combination numbers 1 to 5 are found not to be working and thus are not available for selection. Among the instruments of the combination numbers 6 to 11, the stroke times Ts obtained using those of the combination numbers 6 and 11 are less than or equal to the maximum stroke time Tmax. However, since the post-return pressures Pr are less than or equal to the minimum working pressure Pmin, those instruments are not available for selection. The instruments of the combination numbers 7 to 10 are also not available for selection since the post-return pressures Pr are less than or equal to the minimum working pressure Pmin.

Similarly, the instruments of the combination numbers 12 to 14 are found not to be working and thus are not available for selection. The instruments of the combination numbers 15 to 17 are not available for selection since the post-return pressure Pr are less than or equal to the minimum working pressure Pmin. The instruments of the combination number 18 are available for selection since the stroke time Ts is less than or equal to the maximum stroke time Tmax and, at the same time, the post-return pressure Pr is greater than the minimum working pressure Pmin.

Figure 17:
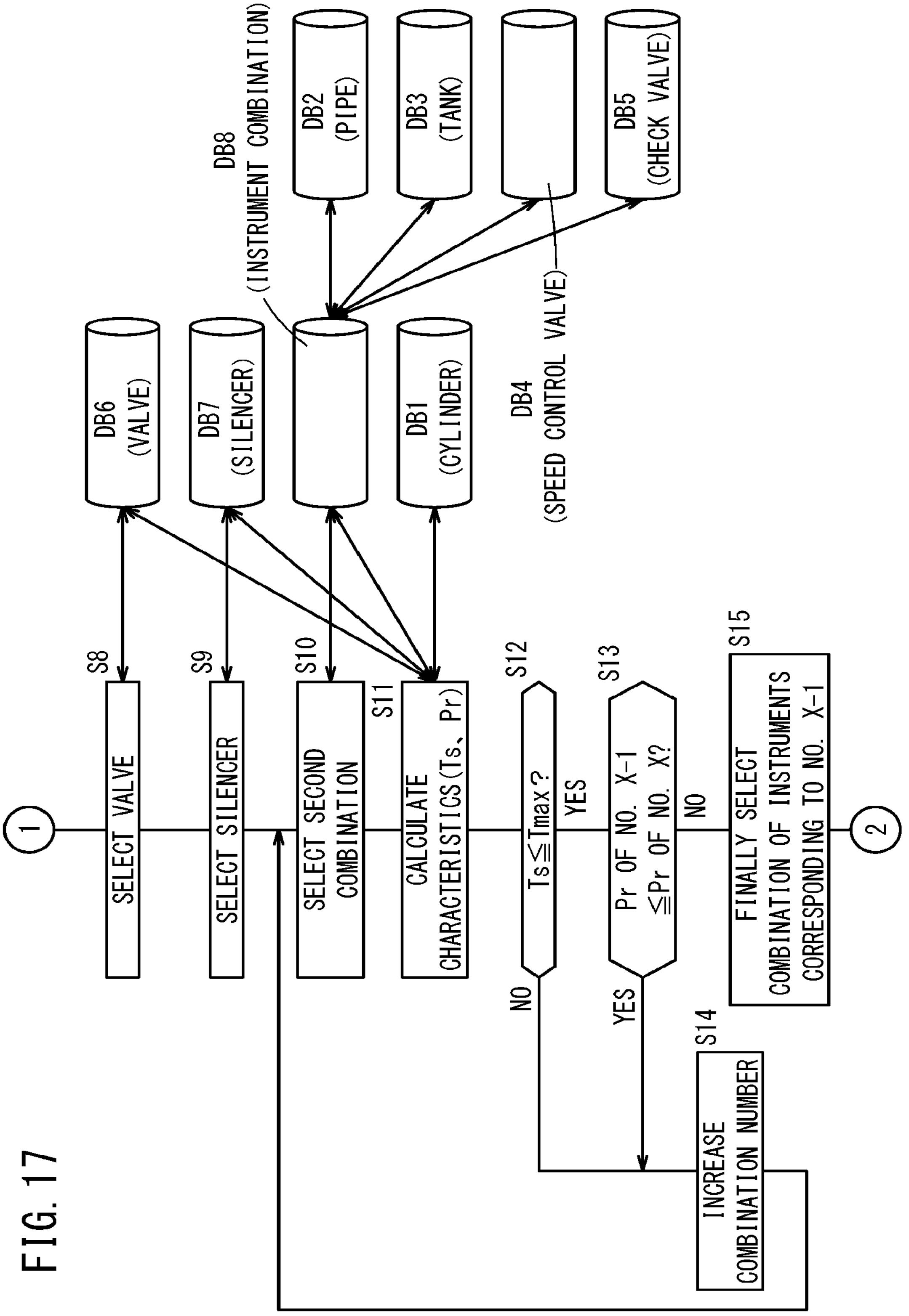
FIG. 17 is a flowchart (2) illustrating the processing operations of the selection system.

On the other hand, if the determination result in step S6 in FIG. 15 is negative (NO in step S6; as in the case of the combination number 18 in the example in FIG. 16), the process proceeds to step S8 in FIG. 17. First, the valve selection section 130 reads information about, for example, the external pilot valve circuit (single body-ported type, single base-mounted type, or the like) from the valve database DB6 based on the input from the operator, and then displays the information together with the product number of the valve H on the display 106. At this moment, the valve selection section 130 stores, for example, the product number of the valve H input based on the operation of the operator, in the storage unit 112.

In step S9, the silencer selection section 132 selects the silencer I connectable to the valve H selected by the valve selection section 130 from the silencer database DB7. At this moment, the silencer selection section 132 stores, for example, the product number of the silencer I input based on the operation of the operator, in the storage unit 112.

In step S10, the second combination selection section 124B selects the combination number, which has not been selected in step S3, from the instrument combination database DB8 in ascending order and reads the data about the pipe A, the pipe B, and the pipe C corresponding to the selected combination number from the pipe database DB2. Moreover, the second combination selection section 124B reads the data about the tank D corresponding to the selected combination number from the tank database DB3, and the data about the check valve E corresponding to the selected combination number from the check valve database DB5. Furthermore, the second combination selection section 124B reads the data about the speed control valve F and the speed control valve G corresponding to the selected combination number from the speed control valve database DB4. Subsequently, the second combination selection section 124B starts the characteristic calculation section 126.

In step S11, the characteristic calculation section 126 performs simulations based on the sizes and the like of the cylinder 30, the pipe A, the pipe B, the pipe C, the tank D, the check valve E, the speed control valve F, the speed control valve G, the valve H, and the silencer I that have been selected, to thereby determine the stroke time Ts during the drive process and the post-return pressure Pr during the return process.

In step S12, the second reselection section 128B determines whether the stroke time Ts obtained in step S11 is less than or equal to the preset maximum stroke time Tmax. If the determination result is positive, the process proceeds to step S13, and the second reselection section 128B determines whether the post-return pressure Pr of NO. X−1 is less than or equal to the post-return pressure Pr of NO. X, where "NO. X" and "NO. X−1" respectively refer to the current and previous combination numbers.

If the determination result in step S12 is negative (NO in step S12) or if the determination result in step S13 is positive (YES in step S13), the process proceeds to step S14, and the second reselection section 128B reselects the instruments of larger sizes. That is, the second reselection section 128B adds one to the index for selection (combination number) used by the second combination selection section 124B and then starts the second combination selection section 124B to repeat the process from step S10.

If the determination result in step S13 is negative, in step S15, the second combination selection section 124B finally selects the instrument combination corresponding to the previous combination number selected immediately before the current combination number.

Figure 18:
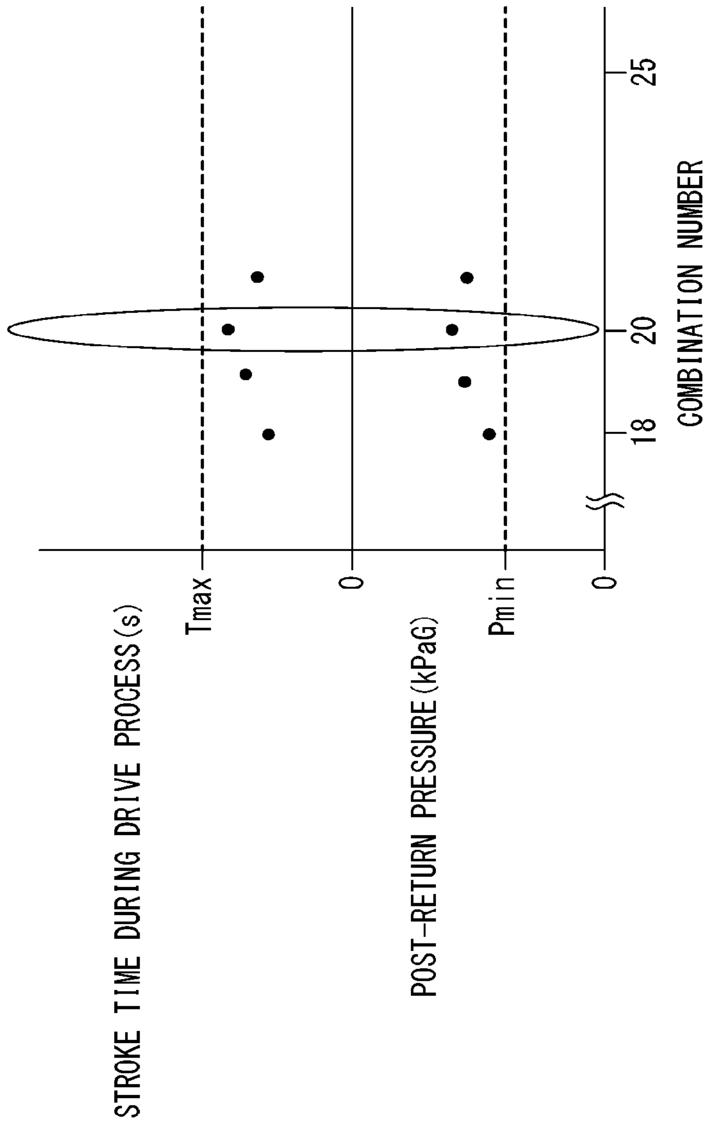
FIG. 18 is a graph illustrating the stroke times during the drive process and the post-return pressures obtained using instruments of the combination numbers 18 to 21.

In the process from steps S11 to S14 described above, the instruments are selected as illustrated in, for example, FIG. 18. That is, all the instruments of the combination numbers 18 to 21, for example, are available for selection since the stroke times Ts are less than or equal to the maximum stroke time Tmax and, at the same time, the post-return pressures Pr are greater than the minimum working pressure Pmin. However, among the instruments of the combination numbers 18 to 21, only those of the combination number 21 generate the post-return pressure Pr less than the post-return pressure Pr corresponding to the previous combination number. Thus, the instruments of the combination number 20 immediately before the combination number 21 are finally selected in step S15.

Figure 19:
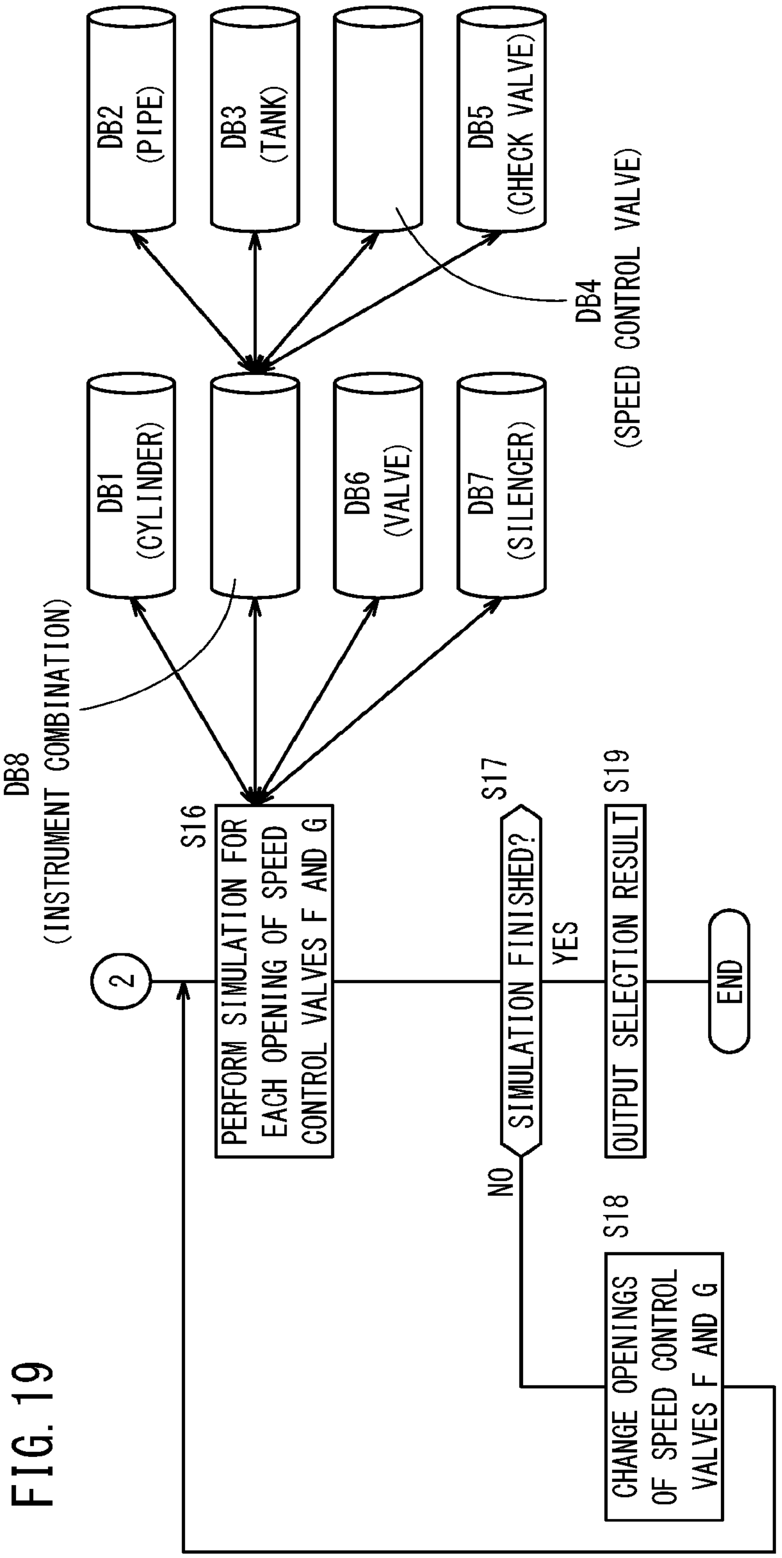
FIG. 19 is a flowchart (3) illustrating the processing operations of the selection system.

Subsequently, in step S16 in FIG. 19, the opening-specific computation section 134 starts the characteristic calculation section 126 and computes the stroke time Ts, the average velocity, the terminal velocity, the kinetic energy and the allowable energy, the 90% thrust establishment time, and the like during the drive process of the piston 38 for each opening of the speed control valves F and G.

In step S17, it is determined whether the simulations for each of the preset openings have finished. If not (NO in step S17), the process proceeds to step S18, and the opening-specific computation section 134 changes the openings of the speed control valves F and G to perform the process from step S16.

In the opening-specific computation, simulations are performed for each of the preset openings. The simulations can be performed either for all the openings or for a plurality of preset openings as a matter of course.

If it is determined that the simulations for each of the preset openings have finished in step S17 (YES in step S17), the process proceeds to step S19, and the selection result output section 136 outputs the results of selection performed by the above-described selection sections to the display 106 through the communication control section 138 to display the selection results on the display 106.

Invention Derived from Embodiment

The invention that can be understood from the above-described embodiment will be described below.

The fluid circuit selection system 100 according to this embodiment, which is a selection system for the fluid circuit 10 including at least the cylinder 30 and a plurality of instruments connected to the cylinder 30, includes the cylinder selection section 120 configured to select the cylinder 30, the database DB8 including the information about the combinations of the plurality of instruments registered in advance at least in order of size, the combination selection section 124A (124B) configured to read the information about the combinations of the plurality of instruments from the database DB8 in order of size to select the instruments, and the reselection section 128A (128B) configured to reselect the instruments of larger sizes in the case where the stroke time Ts obtained from the simulation performed using the part of the instruments selected by the combination selection section 124A (124B) exceeds the preset maximum stroke time Tmax or in the case where the post-return pressure Pr obtained from the simulation is less than or equal to the minimum working pressure Pmin.

To achieve the energy-saving fluid circuit 10 that reuses exhaust air as is the fluid pressure cylinder drive device, the sizes of the instruments need to be appropriately selected; otherwise the requirements and specifications are difficult to satisfy.

That is, the performance of the above-described energy-saving fluid circuit 10 that reuses exhaust air may deteriorate due to the sizes of the drive units (the speed control valves, the pipes, the check valve, the valve, the silencer, the tank, and the like).

Thus, the instruments are selected using the database DB8 including the information about the combinations of the plurality of instruments registered in advance at least in order of size. Furthermore, in the case where the stroke time Ts obtained from the simulation performed using the part of the instruments selected by the combination selection section 124A (124B) exceeds the preset maximum stroke time Tmax, or in the case where the post-return pressure Pr obtained from the simulation is less than or equal to the minimum working pressure Pmin, the instruments of larger sizes are reselected. As a result, the sizes of the drive units used in the energy-saving fluid circuit that reuses exhaust air can be appropriately selected.

The fluid circuit selection system 100 according to this embodiment includes the valve selection section 130 configured to select the valve H by the input operation, and the silencer selection section 132 configured to select the silencer I by the input operation, the valve H and the silencer I being included in the plurality of instruments.

This is effective in a case where the database DB8 does not store the information about the valve H or the information about the silencer I. Moreover, in a case where one valve H is adaptable to instruments of various sizes, a different valve H can be applied by the input operation to check, for example, improvements in the performance compared with the regularly selected valve H.

Moreover, the fluid circuit selection system 100 according to this embodiment, which is a selection system for the fluid circuit including at least the cylinder 30 and the plurality of instruments connected to the cylinder 30, includes the cylinder selection section 120 configured to select the cylinder 30, the database DB8 including the information about the combinations of the plurality of instruments registered in advance at least in order of size, the combination selection section 124A (124B) configured to read the information about the combinations of the plurality of instruments from the database DB8 in order of size to select the instruments, the first reselection section 128A configured to reselect the instruments of larger sizes in the case where the stroke time Ts obtained from the simulation performed using the part of the instruments selected by the combination selection section 124A (124B) exceeds the preset maximum stroke time Tmax or in the case where the post-return pressure Pr obtained from the simulation is less than or equal to the minimum working pressure Pmin, and the second reselection section 128B configured to reselect the instruments of larger sizes in the case where the stroke time Ts obtained from the simulation performed using all the selected instruments exceeds the preset maximum stroke time Tmax or in the case where the post-return pressure Pr obtained using the currently selected instruments is greater than or equal to the post-return pressure Pr obtained using the previously selected instruments.

As a result, the sizes of the drive units used in the energy-saving fluid circuit that reuses exhaust air can be appropriately selected. In particular, in addition to the first reselection section 128A, the second reselection section 128B can optimize the selection of the instruments. That is, in the case where the stroke time Ts exceeds the preset maximum stroke time Tmax, or in the case where the post-return pressure Pr obtained using the currently selected instruments is greater than or equal to the post-return pressure Pr obtained using the previously selected instruments, the instruments of larger sizes are reselected. As a result, the stroke time Ts can be set to a value closest to the maximum stroke time Tmax without exceeding the preset maximum stroke time Tmax. In addition, the combination of the instruments generating the largest post-return pressure Pr can be selected.

In this embodiment, the second reselection section 128B reselects the instruments of larger sizes except for the valve H and the silencer I that have been selected by the input operation.

Since the valve H and the silencer I have been already selected by the input operation, the second reselection section 128B optimizes the instruments without changing the valve H and the silencer I. That is, the second reselection section 128B reselects the instruments of larger sizes except for the valve H and the silencer I. As a result, selection time can be reduced.

In this embodiment, the fluid circuit 10 includes the cylinder 30 including the first air chamber 42*a* and the second air chamber 42*b* partitioned by the piston 38, the valve 16 (H) configured to switch between the position for the drive process of the piston 38 and the position for the return process of the piston 38, the first pipe 12*a* (B) disposed between the first air chamber 42*a* and the valve 16 (H), and the second pipe 12*b* (A) disposed between the second air chamber 42*b* and the valve 16 (H). The tank 68 (D) is disposed on the first pipe 12*a* (B) adjacent to the first air chamber 42*a*. The two speed control valves 50*a* (F) and 50*b* (G) are disposed in series on the second pipe 12*b* (A).

During the drive process of the piston 38, the supply rate from the valve 16 (H) to the second air chamber 42*b* can be adjusted by the adjustable throttle valve 54*b* of the speed control valve 50*b* (G). During the return process of the piston 38, the discharge rate from the second air chamber 42*b* to the valve 16 (H) can be adjusted by the adjustable throttle valve 54*a* of the speed control valve 50*a* (F). That is, the supply rate to the cylinder 30 and the discharge rate from the cylinder 30 can be separately adjusted. This leads to a reduction in the stroke time Ts during the drive process and an increase in the pressure Pr inside the fluid pressure cylinder after the return process, which are required characteristics of the fluid circuit 10. In addition, the two speed control valves 50*a* (F) and 50*b* (G) are simply disposed in series on the second pipe 12*b* (A), also leading to simplification of the structure.

The fluid circuit selection system and the fluid circuit selection method according to the present invention are not limited in particular to the embodiment described above, and may have various configurations without departing from the scope of the present invention as a matter of course.

The invention claimed is:

1. A fluid circuit selection system for a fluid circuit including at least a cylinder and a plurality of instruments connected to the cylinder, the fluid circuit selection system comprising:

a cylinder selection section configured to select the cylinder:

a database including information about combinations of the plurality of instruments registered in advance at least in order of size:

a combination selection section configured to read the information about the combinations of the plurality of instruments from the database in order of size to select the instruments:

a characteristic calculation section configured to perform simulations to determine various characteristics of the selected instruments:

a first reselection section configured to perform a first reselection process of instruments of larger sizes in: (1) a case where a stroke time obtained from a first simulation performed using part of the instruments selected by the combination selection section exceeds a preset maximum stroke time; and (2) a case where a pressure for driving a piston rod of the cylinder obtained from the first simulation after a return process in which the piston rod is retracted into the cylinder is less than or equal to a minimum working pressure required for driving the piston rod; and a second reselection section configured to perform a second reselection process of the instruments of larger sizes in a case where a stroke time obtained from a second simulation performed using all the instruments selected by the combination selection section exceeds the preset maximum stroke time, wherein in the second reselection process after the first reselection process, the second simulation is performed based on the result of the first reselection process, in a case that the second reselection process is performed, then a third simulation using all the instruments selected on a basis of an execution result of the second reselection process is performed, and in a case where a second pressure obtained from the third simulation after the return process is greater than or equal to a second pressure obtained from the second simulation after the return process, a third reselection process of the instruments of larger sizes is performed.

2. The fluid circuit selection system according to claim 1, further comprising:

a valve selection section configured to select, by an input operation, a valve included in the plurality of instruments; and a silencer selection section configured to select, by the input operation, a silencer included in the plurality of instruments.

3. The fluid circuit selection system according to claim 2, wherein the second reselection section reselects the instruments of larger sizes except for the valve and the silencer that have been selected by the input operation.

4. The fluid circuit selection system according to claim 1, wherein the fluid circuit includes:

the cylinder including a first air chamber and a second air chamber partitioned by a piston;

a valve configured to switch between a position for a drive process of the piston and a position for the return process of the piston;

a first flow path disposed between the first air chamber and the valve; and a second flow path disposed between the second air chamber and the valve, wherein a tank is disposed on the first flow path adjacent to the first air chamber, and two speed control valves are disposed in series on the second flow path.

5. A fluid circuit selection method for a fluid circuit including at least a cylinder and a plurality of instruments connected to the cylinder, the fluid circuit selection method comprising:

selecting the cylinder:

combination-selecting including reading information about combinations of the plurality of instruments in order of size from a database including the information about the combinations of the plurality of instruments registered in advance at least in order of size, to select the instruments; and performing a first reselection process of reselecting the instruments of larger sizes in: (1) a case where a stroke time obtained from a first simulation performed using part of the instruments selected in the combination selection step exceeds a preset maximum stroke time; and (2) a case where a pressure after a return process obtained from the first simulation after a return process in which a piston rod of the cylinder is retracted into the cylinder is less than or equal to a minimum working pressure required for driving the piston rod.

6. The fluid circuit selection method according to claim 5, further comprising:

performing a second reselection process of reselecting the instruments of larger sizes in a case where a stroke time obtained from a second simulation performed using all the instruments selected by the combination-selecting exceeds the preset maximum stroke time, wherein in the second reselection process after the first reselection process, the second simulation is performed based on the result of the first reselection process, in a case where the second reselection process is performed, then a third simulation using all the instruments selected on a basis of an execution result of the second reselection process is performed, and in a case where a third pressure obtained from the third simulation after the return process is greater than or equal to a second pressure from the second simulation after the return process, a third reselection process of the instruments of larger sizes is performed.

* * * * *